(12) United States Patent
Myeong et al.

(10) Patent No.: US 10,578,481 B2
(45) Date of Patent: Mar. 3, 2020

(54) WATER LEVEL DETECTING DEVICE AND DEHUMIDIFIER HAVING THE SAME

(71) Applicant: Samsung Electronics Co., Ltd., Gyeonggi-do (KR)

(72) Inventors: Seong-ryeol Myeong, Gyeonggi-do (KR); Sung-woo Kim, Gyeonggi-do (KR); Jung-ho Kim, Gyeonggi-do (KR); Heung-seob Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/952,746

(22) Filed: Nov. 25, 2015

(65) Prior Publication Data

US 2016/0153824 A1 Jun. 2, 2016

(30) Foreign Application Priority Data

Nov. 27, 2014 (KR) .......................... 10-2014-0167415

(51) Int. Cl.
*G01F 23/72* (2006.01)
*F24F 3/14* (2006.01)
(Continued)

(52) U.S. Cl.
CPC ............... *G01F 23/72* (2013.01); *F24F 3/14* (2013.01); *F24F 3/1405* (2013.01); *F24F 11/30* (2018.01);
(Continued)

(58) Field of Classification Search
CPC .......... G01F 23/72; G01F 23/74; H01H 36/02
(Continued)

(56) References Cited

U.S. PATENT DOCUMENTS 4,649,898 A * 3/1987 Martinson ................. A23L 3/10
126/348
6,028,521 A 2/2000 Issachar
(Continued)

FOREIGN PATENT DOCUMENTS

CN 1343857 A 4/2002
CN 1786601 A 6/2006
(Continued)

OTHER PUBLICATIONS

Machine translation of WO 2013081298 A1.*
(Continued)

*Primary Examiner* — Justin Seo
*Assistant Examiner* — David L Singer

(57) ABSTRACT

A water level detecting device and a dehumidifier including the same are provided. The water level detecting device comprises a guide arranged within a water container for collecting a condensate water generated as a dehumidifying function is performed, a sensing object inserted within the guide and configured to ascend on the condensate water collected in the water container, and a sensor arranged in a main body of a dehumidifier which the water container is mounted to and dismounted from, and configured to sense a movement of the sensing object. The water level of the water container is set to any of at least two different water levels according to an inserting direction of the sensing object inserted into the guide.

12 Claims, 36 Drawing Sheets

(51) Int. Cl.
*F24F 13/22* (2006.01)
*F24F 11/30* (2018.01)
*F24F 11/89* (2018.01)
*F24F 140/30* (2018.01)

(52) U.S. Cl.
CPC ............ *F24F 11/89* (2018.01); *F24F 13/222* (2013.01); *F24F 2003/1446* (2013.01); *F24F 2140/30* (2018.01)

(58) Field of Classification Search
USPC ........................................................ 73/322.5
See application file for complete search history.

(56) References Cited

U.S. PATENT DOCUMENTS

| | | | |
|---|---|---|---|
| 6,199,428 | B1 | 3/2001 | Esetevez-Garcia et al. |
| 6,356,071 | B1* | 3/2002 | Koski .................. B01D 39/20 324/207.13 |
| 2002/0005715 | A1* | 1/2002 | Sato ........................ G01B 7/003 324/207.2 |
| 2002/0194674 | A1* | 12/2002 | McKenna ............... E03C 1/242 4/538 |
| 2003/0196488 | A1* | 10/2003 | Mann ...................... G01F 23/02 73/313 |
| 2009/0120118 | A1* | 5/2009 | Yoon ......................... F24F 3/14 62/259.1 |
| 2009/0158934 | A1 | 6/2009 | Jang et al. |
| 2013/0049743 | A1* | 2/2013 | Sawano .................... G01F 1/24 324/207.24 |
| 2016/0123791 | A1* | 5/2016 | Yasuda .................. G01F 23/72 73/305 |

FOREIGN PATENT DOCUMENTS

| | | | |
|---|---|---|---|
| CN | 1892122 | A | 1/2007 |
| CN | 203100834 | U | 7/2013 |
| CN | 203337230 | U | 12/2013 |
| CN | 203572554 | U | 4/2014 |
| JP | S56-620 | A | 1/1981 |
| JP | 58069084 | A | 4/1983 |
| JP | 63003226 | A * | 1/1988 |
| JP | 2002031558 | A | 1/2002 |
| JP | 2007183191 | A | 7/2007 |
| KR | 10-2013-0055293 | | 5/2013 |
| KR | 10-2013-0138478 | | 12/2013 |
| KR | 10-2014-0110655 | | 9/2014 |
| WO | 9931469 | A2 | 6/1999 |
| WO | 2010115310 | A1 | 10/2010 |
| WO | WO 2013-081298 | | 6/2013 |
| WO | WO 2014196194 | A1 * | 12/2014 ............ G01F 23/72 |

OTHER PUBLICATIONS

Korean-English Dictionary entry for "Mansuwi", NAVER Korean English Dictionary.*
ASEA Brown Boveri, ABB Product Group Brochure: Magnetic Level Gauges K-TEK Products, 2013 (Year: 2013).*
LinguaLinx Language Solutions, Human Translation of CN 203100834 U, 2018 (Year: 2018).*
International Search Report and Written Opinion issued for PCT/KR2015/011689 dated Feb. 26, 2016, 10 pgs.
Extended European Search Report for European Application No. 15863921.1, dated Sep. 6, 2017. (11 pages).
Foreign Communication from Related Counterpart Application; Australian Patent Application No. 2015354454; Australian Examination Report No. 1 for standard patent application dated Jan. 5, 2018; 3 pages.
Office Action dated Sep. 18, 2018 in connection with European Patent Application No. 15 863 921.1, 6 pages.
Office Action dated May 2, 2018 in connection with Australian Patent Application No. 2015354454.
Office Action dated May 23, 2018 in connection with Russian Patent Application No. 2017122332.
National Intellectual Property Administraction, PRC, "The First Office Action," Application No. CN201510847146.4, dated Apr. 19, 2019, 11 pages.
National Intellectual Property Administration, PRC, "The Second Office Action," Application No. CN201510847146.4, dated Oct. 14, 2019, 19 pages.
Intellectual Property India, Examination report under section 12 & 13 of the Patents Act, 1970 and the Patents Rules, 2003, Application No. IN 201717018337, dated Jul. 30, 2019, 6 pages.

* cited by examiner

WATER LEVEL DETECTING DEVICE AND DEHUMIDIFIER HAVING THE SAME

CROSS-REFERENCE TO RELATED APPLICATION AND CLAIM OF PRIORITY

The present application is related to and claims benefit under 35. U.S.C. § 119(a) of Korean Patent Application No. 10-2014-0167415, filed on Nov. 27, 2014 in the Korean Intellectual Property Office, the disclosure of which is incorporated herein by reference in its entirety.

TECHNICAL FIELD

Devices consistent with what is disclosed herein relate to a water level detecting device and a dehumidifier having the same, and more specifically, to a water level detecting device configured to selectively set a water level of a water container which collects condensate water and a dehumidifier including the same.

BACKGROUND

A dehumidifier usually includes a compressor, a heat exchanger, and a fan motor, and it operates to absorb moisture from the humid indoor air, remove the moisture from the air, and discharge the air. The dehumidifier forcibly absorbs the humid indoor air by driving the fan motor and passes the absorbed air through the heat exchanger. As the humid air contacts the cold surface of the heat exchanger, the moisture contained in the air is condensed by the temperature difference and formed as droplets on the surface of the heat exchanger. In this manner, the moisture removed is from the air. A dehumidifier also includes a water container for collecting the generated condensate water. As the level of the condensate water collected in the water container ascends and reaches the water level of the water container, a provided sensor senses a floater floating on the condensate water, according to which the dehumidifying stops operating and a user is informed that the water is full. Regarding the related dehumidifier, the water level of the water container is limited to be one single value.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

To address the above-discussed deficiencies, a technical objective is to provide a dehumidifier including a water level detecting device with a simple structure in which a user can set an appropriate water level of a water container as desired. Another technical objective is to provide a dehumidifier in which a user can maintain convenient posture while mounting and dismounting a water container to and from a main body of the dehumidifier.

In a first embodiment, a water level detecting device is provided. The water level detecting device includes a guide arranged within a water container for collecting a condensate water generated as a dehumidifying function is performed, a sensing object inserted within the guide and configured to ascend on the condensate water collected in the water container, and a sensor arranged in a main body of a dehumidifier which the water container is mounted to and dismounted from, and configured to sense a movement of the sensing object. The water level of the water container can be set to any of at least two different water levels according to an inserting direction of the sensing object inserted into the guide. The sensing object includes a magnet arranged in a closer distance to one side from a center of the sensing object. The sensing object is inserted into the guide while the magnet is in an upper or a lower side of the sensing object. The guide guides the sensing object to ascend while maintaining the position as being inserted into the guide, when the sensing object floats on the condensate water. The guide includes a condensate water inlet on one side surface for introducing the condensate water.

The water level detecting device can additionally include a switching member arranged on the guide to slidably move to a first and a second position to select the water level of the water container. The switching member divides an interior of the guide into a first and a second area, and the first and the second area are changed in sizes according to the first and the second positions of the switching member. The switching member interferes with a portion of the sensing object floating and ascending on the condensate water to guide the sensing object to be inserted into the first or the second areas. The sensing object changes an initial position into the first or the second positions while being inserted into the first or the second areas. The switching member includes a set button configured to be slid along a portion of the guide, and a partitioning bar extending toward a bottom of the guide from the set button, wherein a lower end of the partitioning bar is spaced from the bottom of the guide.

The water level detecting device can additionally include at least one additional guide arranged in an interior of the water container, at least one sensing object inserted into the at least one additional guide, and at least one additional sensor arranged in the main body to sense the at least one additional sensing object. The additional guide is arranged at a height different from a height of the lower end of the guide, and the additional sensor is arranged at a height different from a height at which the sensor is arranged. The additional guide is formed in a different length from the guide, and the additional sensing object may be formed in an uniform length to the sensing object. On a center of the sensing object may be arranged a magnet, and on a center of the additional sensing object may be arranged a magnet. The water level detecting device additionally includes at least two select buttons on an outer side of the main body to turn on or turn off the sensor and the additional sensors.

The water level detecting device additionally includes an adjustment button connected to one side of the sensor and arranged outside the main body. The adjustment button modifies the height of the sensor by sliding vertically along an outer surface of the main body. The water level detecting device additionally includes at least one additional sensing object provided with a magnet having a different magnetic intensity from the magnetic intensity of the magnet provided on the sensing object. One of the sensing object and the additional sensing object can be inserted into the guide. The water level detecting device additionally includes a controller configured to calculate a time elapsed from a time to sense a lowest water level through the sensor, compare the calculated elapse time with at least one previously-set elapse time, and determine the calculated time to be at least one water level on a higher position than the lowest water level when the calculated time is uniform to the previously-set elapse time.

In a second embodiment, a dehumidifier is provided. The dehumidifier includes a main body configured to absorb an external air, remove moisture, and discharge the air outside, a water container detachably mounted to and dismounted from a receiving portion of the main body, and is configured to collect a condensate water generated in a dehumidifying process of the main body, and a water level detecting device comprising a guide arranged within the water container, a sensing object inserted into an interior of the guide and floating on the condensate water collected in the water container, and a sensor arranged on a receiving portion of the main body to sense a movement of the sensing object. The water level of the water container can be set to any of at least two different water levels according to an inserting direction of the sensing object inserted into the guide.

The water container can be taken out from a side to an upper direction of the receiving portion of the main body with a slanted upper portion. The main body includes a pair of guiding protrusions arranged to be symmetrical on a left and a right sides of the interior of the receiving portion, and the water container includes a pair of guide ribs on the outer side to be slidably guided along a pair of guiding protrusions on the left and the right sides. The pair of the guiding protrusions includes a pair of guide surfaces curved and protruded toward an upper side, and the pair of the guide ribs is formed in a shape corresponding to the pair of the guide surfaces.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
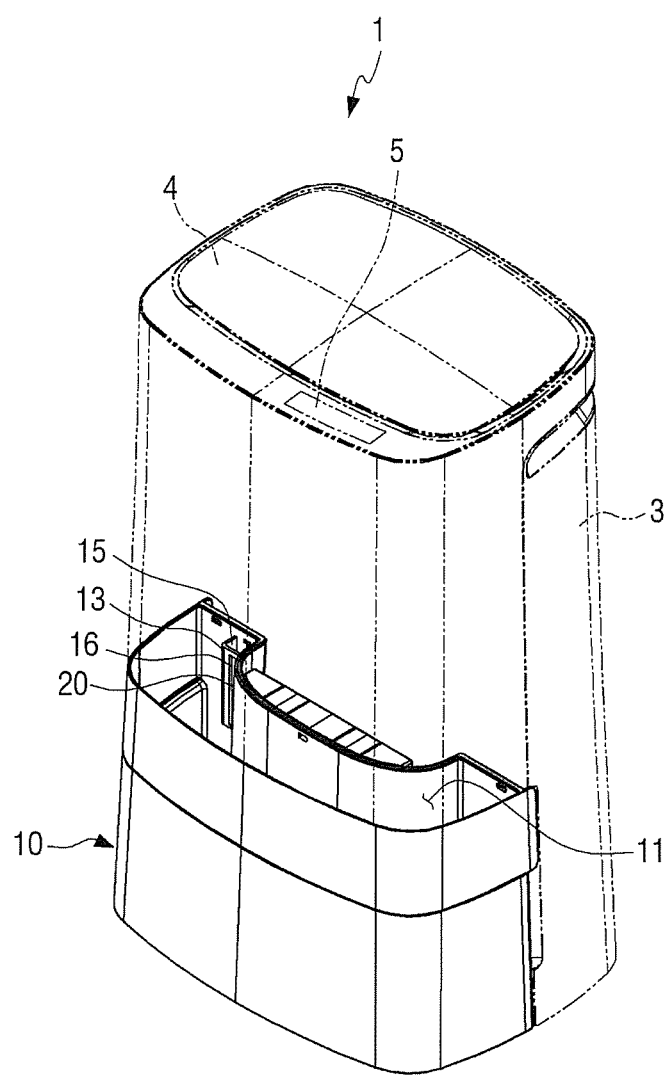
FIG. 1 is a perspective view of an example dehumidifier according to an embodiment.

FIGS. 1 through 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged dehumidifying device or water level detecting device. Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

A dehumidifier usually includes a compressor, a heat exchanger, and a fan motor, and it operates to absorb moisture from the humid indoor air, remove the moisture from the air, and discharge the air. The dehumidifier forcibly absorbs the humid indoor air by driving the fan motor and passes the absorbed air through the heat exchanger. As the humid air contacts the cold surface of the heat exchanger, the moisture contained in the air is condensed by the temperature difference and formed as droplets on the surface of the heat exchanger. In this manner, the moisture removed is from the air. A dehumidifier also includes a water container for collecting the generated condensate water. As the level of the condensate water collected in the water container ascends and reaches the water level of the water container, a provided sensor senses a floater floating on the condensate water, according to which the dehumidifying stops operating and a user is informed that the water is full. Regarding the related dehumidifier, the water level of the water container is limited to be one single value.

However, as the dehumidifier becomes large-sized, the amount of the water container to collect the condensate water also increases. The amount of the water container provided in the home dehumidifier is generally about 5 L or above. As the amount of the water container increases, the amount of the condensate water collected in the water container also increases. For a user who is not an adult man, emptying 5 L or more condensate water from the water container would be difficult due to the weight of the collected condensate water in taking out the water container from a main body of the dehumidifier, holding and carrying the water container, and throwing out the water.

Thus, following to the trend in which the dehumidifier becomes larger, it is necessary to properly select an appropriate water level of the condensate water collected in the water container that suits the user. Meanwhile, in order to empty the condensate water from the water container, the related dehumidifier has the inconvenience in which a user has to bend his or her waist by 90° or kneel down and take the container out with both hands form the main body of the dehumidifier. The inconvenience is attributable to the manner of taking out the water container in the related dehumidifier, in which the water container is taken out toward a user in an approximately horizontal direction to the ground.

A dehumidifier according to an embodiment includes a water level detecting device according to various embodiments which selectively sets the water level of the condensate water collected in a water container. The water level detecting devices will be described below mainly with reference to these embodiments.

Referring to FIG. 1, the dehumidifier 1 according to an embodiment includes a main body 3, and a water container 10 mounted to and dismounted from a receiving portion 7 of FIG. 15 provided on a lower side of a main body 3. The main body 3 includes a constitution for dehumidifying purpose so as to remove the moisture contained in the air and reduce the indoor humidity. Such constitution will not be specifically described below. Further, the main body 3 includes an operating portion 5 on an upper surface 4 to control the dehumidifier 1. The operating portion 5 is implemented to be a touch screen, displays the current humidity and the user-set humidity, and includes a user interface (UI) to display a plurality of buttons for user input.

Figure 2A:
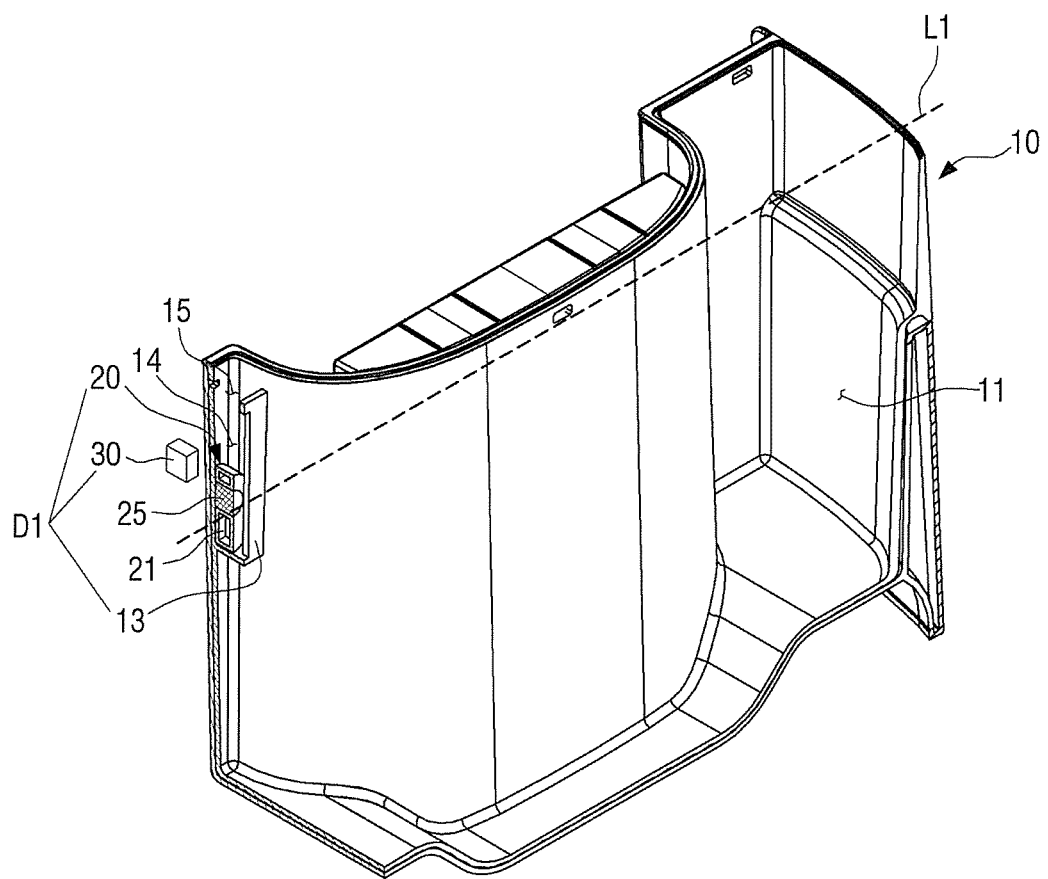
FIG. 2A is a partially-cut cross sectional view illustrating an example water level detecting device is installed on a water container according to this disclosure.

The water container 10 mounted to the receiving portion 7 of the main body 3 collects the condensate water. The water container 10 is taken out from the front of the main body 3 when being dismounted from the receiving portion 7. Referring to FIG. 2A, the water level detecting device D1 according to a first embodiment includes a guide 13, a sensing object 20 and a sensor 30. The guide 13 guides the sensing object 20 floating on the condensate water collected in the water container 10 to move vertically, and is arranged in a position corresponding to approximately the upper surface of the water container 10 of the interior of the water container 10.

As illustrated, the guide 13 is integrated with the interior of the water container 10, although embodiments are not limited thereto. The guide 13 is also formed as a separate member which is separable from the interior of the water container 10. In this case, the guide 13 preferably includes a fixing protrusion that is fixed to an inner surface of the water container 10, and the water container 10 preferably includes a coupling hole (not illustrated) so that the fixing protrusion of the guide 13 is detachably engaged. The guide 13 is formed in a predetermined length along a vertical direction of the water container 10, and provided with a space in which the sensing object 20 is inserted into the interior 14. The space is formed by the guide 13 and a portion of the water container 10.

Figure 3:
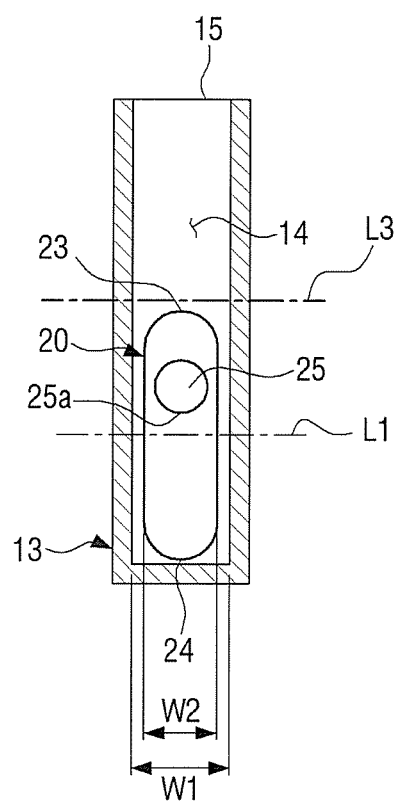
FIG. 3 illustrates an example sensing object floating on a position corresponding to a first water level according to this disclosure.

Referring to FIG. 3, the width W1 of the interior 14 of the guide 13 is preferably larger than the width W2 of the sensing object 20 so that the sensing object 20 ascends along the interior 14 of the guide 13 when floating. The guide 13 includes an opening 15 on an upper end through which the sensing object 20 is inserted into the interior 14 of the guide 13. Further, the guide 13 includes a condensate water inlet 16 along one side of the guide 13 so that the condensate water collected in an interior 11 of the water container 10 is introduced into the interior 14 of the guide 13.

Figure 2B:
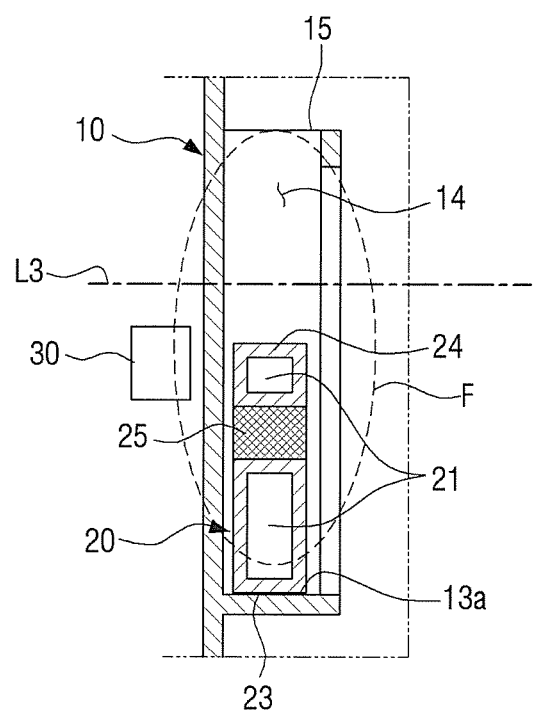
FIG. 2B is a schematic cross sectional view illustrating an example arrangement relation between a sensor and a sensing object according to this disclosure.

Referring to FIGS. 2B and 3, the sensing object 20 is formed in a predetermined length which is shorter than the length of the guide 13. The sensing object 20 is provided with a space 21 therein to form the buoyancy with which the sensing object 20 floats on the condensate water, and the space 21 is kept sealed. When the sensing object 20 is formed of a light-weighted material that floats on the condensate water, the space 21 is omitted. The sensing object 20 includes a magnet 25 that is sensed by the sensor 30. The magnet 25 is arranged more toward the upper end 23 of the sensing object 20. The magnet 25 is coupled with the sensing object 20 while being penetrated through the front and the back surfaces of the sensing object 20.

The initial position of the sensing object 20 is defined as a position in which the sensing object 20 is inserted into the guide 13 and the lower end 24 of the sensing object 20 is seated on a bottom 13a of the guide 13. In the initial position, the magnet 25 is arranged in a position corresponding to the sensor 30, as illustrated in FIG. 2B. In this case, the magnet 25 may not be necessarily arranged in a position corresponding to the sensor 30, and is arranged in a position within the area F where the magnetic field of the magnet 25 reaches.

The position of the sensing object 20 in FIG. 3 is a position in which the sensor 30 senses a first water level L1. This position is placed within the area where the sensor 30 senses the magnet 25, and specifically, within the area where the lower end 25a of the magnet 25 contacts the maximum sensing position L3 or the area within the maximum sensing position L3. In this case, the maximum sensing position L3 corresponds to a distance from the sensor 30 to a portion of the circumference of the magnet 25 within shortest distance. Further, the maximum sensing position L3 is also set to correspond to a distance from the sensor 30 to a portion of the circumference of the magnet 25 within farthest distance.

The sensor 30 is implemented to be a magnetic sensor that senses the magnetic intensity of the magnet 25, and arranged on a portion of the interior of the receiving portion 7 of the main body 3. The sensor 30 transmits a water level sensing signal to a controller (not illustrated) arranged within the main body 3. Further, when the water container 10 is mounted in the receiving portion 7, the sensor 30 senses the magnet 25 of the sensing object 20 and transmit a water container mount signal to the controller. Meanwhile, the water level detecting device D1 according to a first embodiment allows a user to selectively set the water level of the condensate water collected in the water container 10.

Thus, referring to FIG. 3, when the magnet 25 is inserted into the guide 13 in a closer distance to an upper end from a center of the sensing object 20, the water level of the condensate water collected in the water container 10 is set to the first water level. Further, the upper and the lower ends 23, 24 of the sensing object 20 is inverted and inserted into the guide 13, so that the magnet 25 is inserted into the guide 13 in a closer distance to the lower end from the center of the sensing object 20. In this case, the water level of the water container 10 is set to a second water level which is higher than the first water level. Thus, a user of the water level detecting device D1 according to the first embodiment selectively sets the water level of the water container 10 with the simple operation of inverting the sensing object 20 when inserting the sensing object 20 into the guide 13.

The following will describe a process of detecting the water level of the water container 100 as set by a user through the water level detecting device D1 according to the first embodiment. It is assumed for the purpose of explanation herein that the first water level corresponds to about 4 L of the condensate water collected in the water container 10, and the second water level corresponds to about 6 L of the condensate water collected in the water container 10. In order to set the water level of the water container 10 to the first water level, a user inserts the sensing object 20 into the guide 13 by arranging the magnet 25 in a closer distance to the upper end of the sensing object 20, as illustrated in FIG. 3.

After the sensing object 20 is inserted into the guide 13, the water container 10 is mounted in the receiving portion 7 of the main body 3. In this case, the sensor 30 senses the magnet 25 in the initial position of the sensing object 20, and transmit a water container mount signal corresponding to the first water level to the controller. Thereafter, when the dehumidifier 1 is turned on and the dehumidifying operation is performed, air is absorbed into the dehumidifier 1, and discharged through an outlet of the dehumidifier 1 while the humidity is removed. The moisture separated from the air, which is now the condensate water, is collected in the water container 10. When the water level of the condensate water collected in the water container 10 ascends and reaches a predetermined water level, the condensate water is introduced to the interior 14 of the guide 13 through the condensate water inlet 16 of the guide 13. The sensing object 20 ascends along the interior 14 of the guide 13 with the buoyancy, and simultaneously, the position of the magnet 25 ascends. Thus, the magnet 25 is distanced apart from the sensor 30.

When the condensate water collected in the water container 10 reaches the first water level L1 which is previously-set, the lower end of the magnet 25 is positioned in the maximum sensing position L3, and the sensor 30 transmits a first water level sensing signal to the controller. The controller controls a driver of the dehumidifier 1 so that the dehumidifying operation is not performed. In this case, the controller informs a user that the water container 10 is full through an outputter (e.g., a speaker) provided within the main body 3. Further, the controller informs that the water container 10 is full by displaying a message or an image on an indicator 5 provided on the main body 3.

Figure 4:
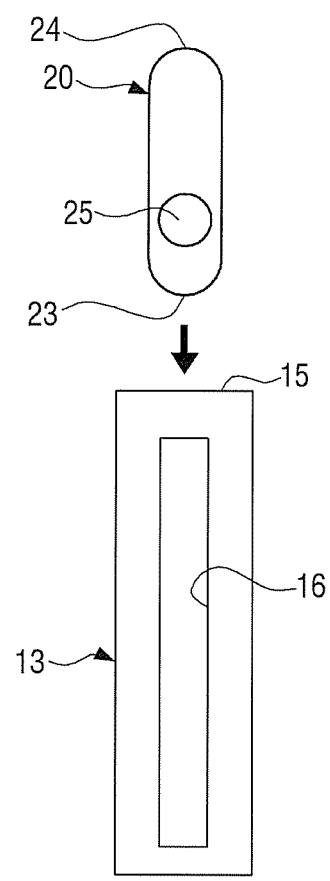
FIG. 4 illustrates an example state in which the sensing object of FIG. 3 is inserted into a guide in an inverted position to the position of FIG. 3 according to this disclosure.
Figure 5:
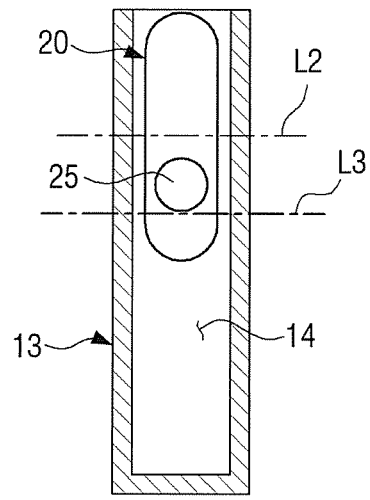
FIG. 5 illustrates an example state in which the sensing object of FIG. 4 floats on a position corresponding to a second water level according to this disclosure.

Meanwhile, when a user wants to change the water level of the water container 10 into the second water level, the water level is simply changed by keeping the sensing object 20 so that the magnet 25 is in a closer distance to the lower end of the sensing object 20 and inserting the sensing object 20 into the guide 13, as illustrated in FIG. 4. Referring to FIG. 5, when the water level of the water container 10 is changed into the second water level, the position of the magnet 25 in which the sensing object 20 is set to the second water level is different from the position of the magnet 25 in which the sensing object 20 is set to the first water level. Thus, when the water container 10 is mounted in the receiving portion 7 of the main body 3, the sensor 30 transmits a second water container mount signal corresponding to the second water level.

Likewise the setting of the first water level described herein, the sensing object 20 floats and ascends on the condensate water collected in the water container 10 because of the buoyancy. In this case, when the water level of the condensate water reaches the position corresponding to the second water level L2, the lower end of the magnet 25 is set to the maximum sensing position L3, and the sensor 30 transmits a second water level sensing signal to the controller.

Figure 6:
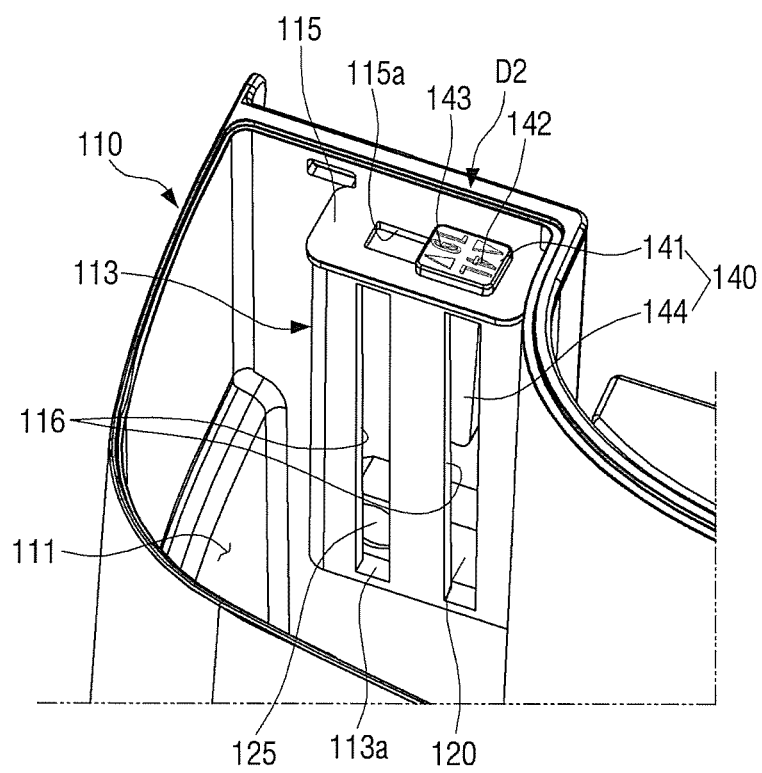
FIG. 6 is a partially-cut cross sectional view illustrating an example water level detecting device installed on a water container according to this disclosure.

The following will explain the constitution of the water level detecting device D2 according to a second embodiment by referring to FIGS. 6 to 10. The water level detecting device D2 according to the second embodiment is implemented to be of a constitution in which the first and the second water levels is set with a switch form. Referring to FIG. 6, the water level detecting device D2 includes a guide 113 arranged in an interior 111 of the water container 110, a sensing object 120, a sensor 130, and a switching member 140.

Figure 8A:
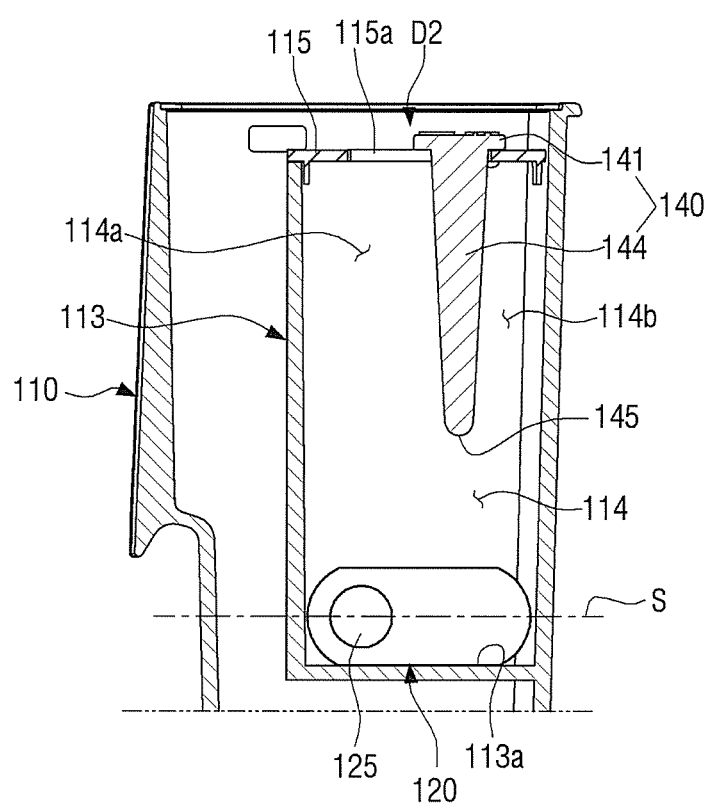
FIGS. 8A, 8B, and 8C are diagrams illustrating, in sequential order, an example sensing object floating from an initial position to a position corresponding to a first water level as the amount of the condensate water collected in the water container increases according to this disclosure.

The guide 113 includes a space in which a portion of the sensing object 120 and the switching member 140 are arranged. The lower end of the guide 113 is closed by the bottom 113a, and the upper end includes an upper plate 115 including a guide hole 115a including a long slot in which the switching member 140 slidably moves along a linear direction. The bottom 113a of the guide 113 is seated in a state in which the sensing object 120 is lied down horizontally as illustrated in FIG. 8A so that the initial position of the sensing object 120 is sensed by the sensor 130. A pair of the condensate water inlets 116 is penetrated and formed along the length direction of the guide 113 on one side surface of the guide 113. The sensing object 120 is configured uniformly as the sensing object 20 applied to the water level detecting device D1 according to the first embodiment, and will not be specifically described below.

Figure 7:
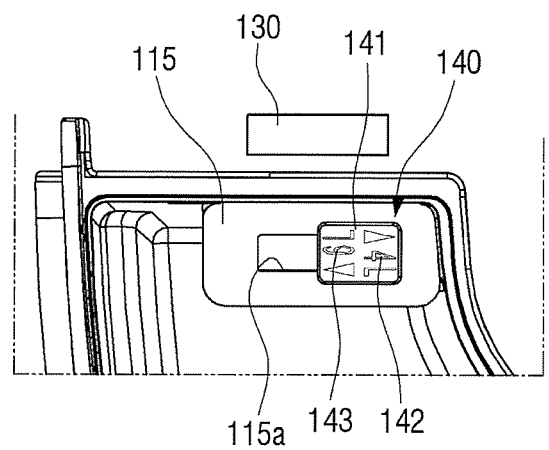
FIG. 7 illustrates an example set switch set to a first water level according to this disclosure.

Referring to FIG. 7, the sensor 130 is arranged on the portion of the inner surface of the receiving portion 7 of the main body 3, and preferably arranged at a height corresponding to the initial position of the sensing object 120 (S1 referred by FIGS. 8A and 10A) or the adjacent height. The switching member 140 includes a slide button 141 slidably coupled with the guide hole 115a of the guide 113, and a partitioning bar 144 extending along the vertical direction from the lower end of the slide button 141.

The slide button 141 includes a first water level indicator 142 and a second water level indicator 143 on an upper surface of the water container 110. The first water level indicator 142 includes embossed characters indicating the first water level (e.g., '4 L') and the embossed images indicating a moving direction of the slide button 141 to set the first water level. The second water level indicator 143 includes embossed characters indicating the second water level (e.g., '6 L') and embossed images indicating a moving direction of the slide button 141 to set the second water level. The partitioning bar 144 divides the interior 114 of the guide 113 into a first and a second areas 114a, 114b when the slide button 141 is moved to the right (see FIG. 8A) or the left (see FIG. 10A) to select the first or the second water level.

The first area 114a is changed to a broader width than the width of the second area 114b when the slide button 141 is moved to the right to set the first water level of the water container. Thereby, the sensing object 120 floating on the condensate water is guided to enter the first area 114a by the partitioning bar 144. The second area 114b is changed to a broader width than the width of the first area 114a when the slide button 141 is moved to the left to set the second water level. Thereby, the sensing object 120 floating on the condensate water is guided to enter the second area 114b by the partitioning bar 144.

The following will describe the water level detecting process of the water level detecting device D2 according to the second embodiment in which the water level of the water container 110 is set to the first water level. First, the water container 110 is taken out from the receiving portion 7 of the main body 3, and the slide button 141 of the switching member 140 is slidably moved to the right, as illustrated in FIG. 7. In this case, the partitioning bar 144, moving to the right with the slide button 141, expands the first area 114a of the interior 114 of the guide 113 to have a broader width than the width of the second area 114b. When the water container 110 is mounted in the receiving portion 7 of the main body 3, the sensor 30 is seated on the bottom 113a of the guide 113 as illustrated in FIG. 8A, senses the magnet 125 of the sensing object 120 in the initial position, and transmits a first water container mount signal corresponding to the first water level to the controller.

Figure 8B:
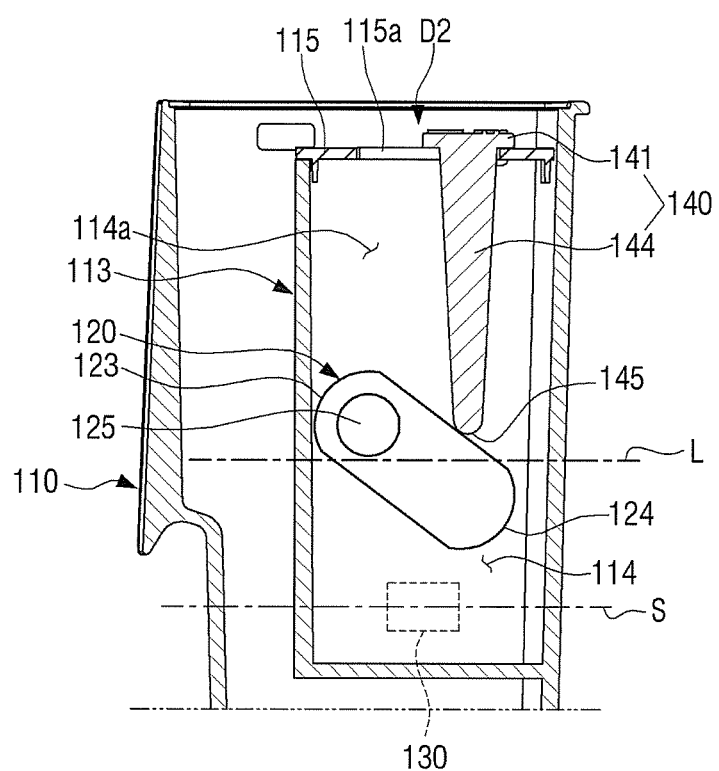
Figure 8C:
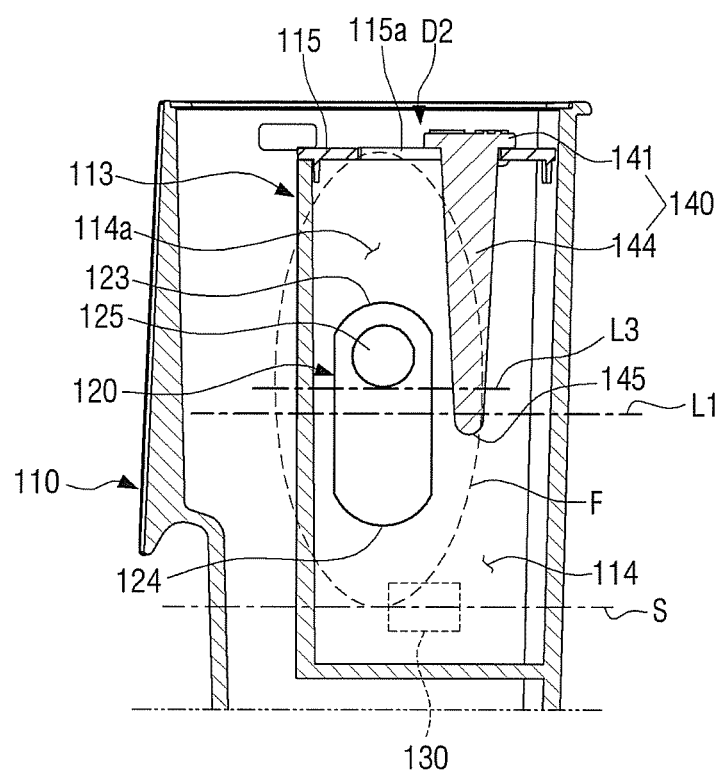

Thereafter, when the dehumidifying operation of the dehumidifier 1 is performed, the condensate water is collected in the water container 110. While the water level of the condensate water collected in the water container 110 ascends, the condensate water is introduced into the interior 114 of the guide 113 through the condensate water inlet 116. Thereby, the sensing object 120 ascends by the buoyancy. At the above-described process, when the sensing object 120 reaches a predetermined level L as illustrated in FIG. 8B, one side of the sensing object 120 (such as the portion adjacent to one end 124 spaced from the magnet 125) is interfered by the end 145 of the partitioning bar 144, and the sensing object 120 is introduced into the first area 114a.

The sensing object 120 continues to ascend while changing into an upright position on the first area 114a, and as the condensate water collected in the water container 110 reaches the first water level L1 which is previously-set, the lower end of the magnet 125 is positioned in the maximum sensing position L3. Herein, the magnetic field F of the magnet 125 influences the initial position S where the sensor 130 is positioned so that the sensor 130 senses the magnet 125. The sensor 130 transmits a first water level sensing signal to the controller, and the controller stops the dehumidifying by controlling the driver of the dehumidifier 1. In this case, the controller informs a user of the full storing state of the water container 110 through the outputter or the indicator 5 provided within the main body 3 likewise in the water level detecting device D1 according to a first embodiment.

Figure 9:
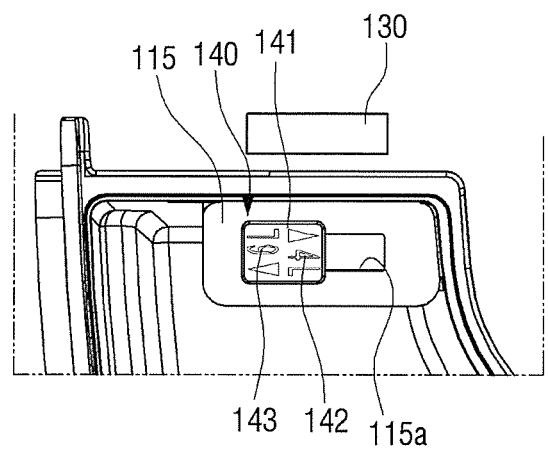
FIG. 9 illustrates an example set switch set to a second water level according to this disclosure.
Figure 10A:
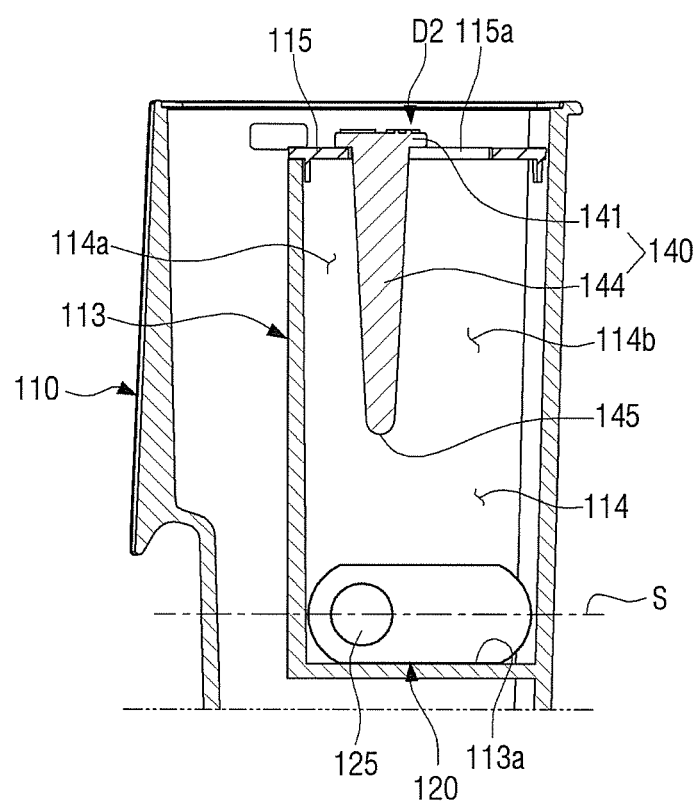
FIGS. 10A, 10B, and 10C are diagrams illustrating, in sequential order, an example sensing object floating from the initial position to a position corresponding to a second water level as the amount of the condensate water collected in the water container increases according to this disclosure.

Meanwhile, when a user is trying to change the water level of the water container 110 from the first water level to the second water level, the water level is changed with the simple operation to slide the slide button 141 of the switching member 140 to the left, as illustrated in FIG. 9. When the water level of the water container 120 is changed to be the second water level, the second water level of the water container 110 is sensed by the sensor 130 through the similar process to being changed to be the first water level, which is described above. As illustrated in FIG. 10A, when the slide button 141 of the switching member 140 is slidably moved to the left, the second area 114b of the interior 114 of the guide 113 is expanded by the partitioning bar 144 to have a broader width than the width of the first area 114a.

Figure 10B:
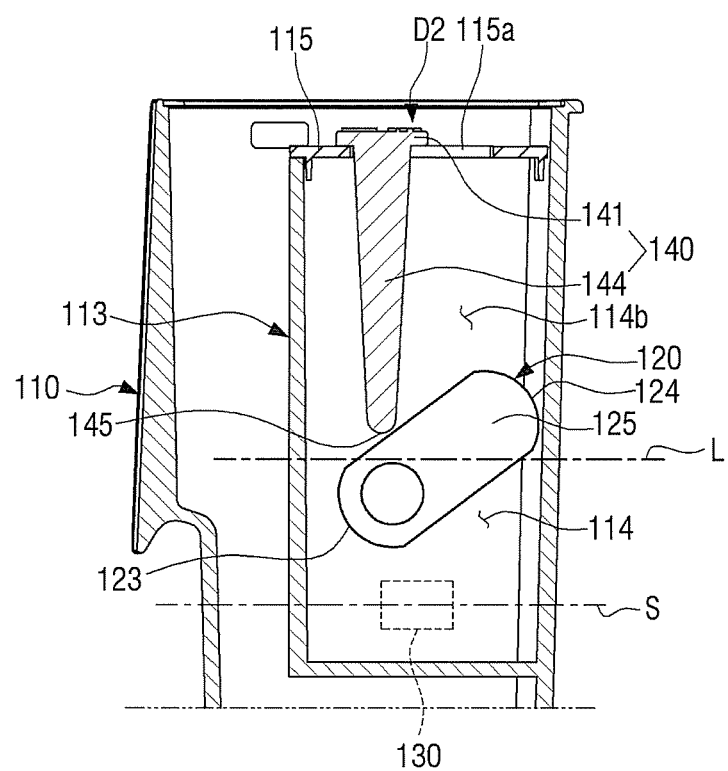
Figure 10C:
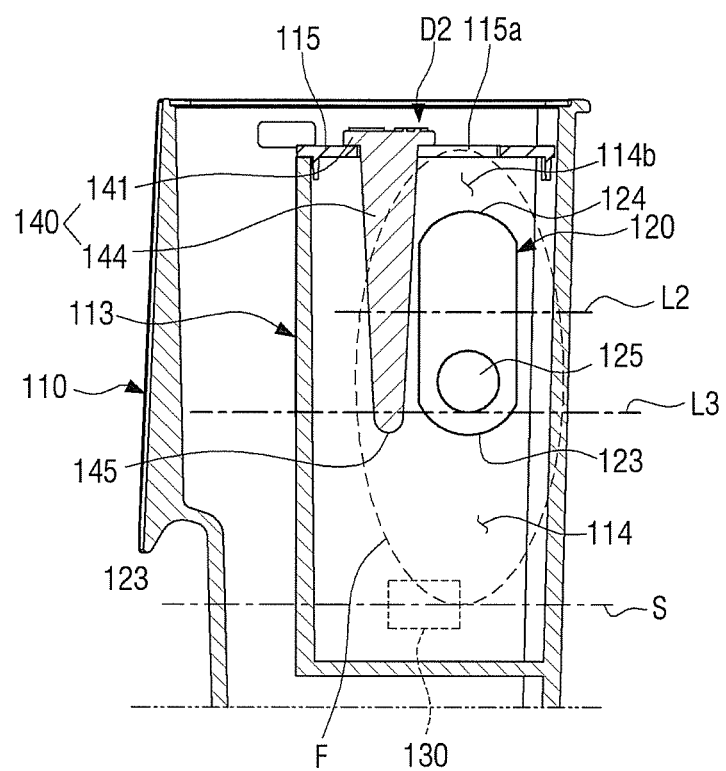

When the water container 110 is mounted in the receiving portion 7 of the main body 3, the sensor 30 is seated on the bottom 113a of the guide 113 as illustrated in FIG. 8A, senses the magnet 125 of the sensing object 120 in the initial position, and transmits a second water container mount signal corresponding to the second water level to the controller. When the dehumidifying of the dehumidifier 1 is performed, the water level of the condensate water collected in the water container 110 ascends. Thereby, the sensing object 120 ascends on the condensate water introduced into the interior 114 of the guide 113 through the condensate water inlet 116. As illustrated in FIG. 10B, when the sensing object 120 reaches a predetermined level L, the other side of the sensing object 120 (i.e., the portion adjacent to one end 123 arranged with the magnet 125) is interfered by the end 145 of the partitioning bar 144, and the sensing object 120 is inserted into the second area 144b.

When the position of the sensing object 120 continues to ascend while being changed into the upright position on the second area 114b and when the condensate water collected in the water container 110 reaches the second water level L2 which is previously-set, the lower end of the magnet 125 is positioned in the maximum sensing position L3. Herein, the magnetic field F of the magnet 125 influences the initial position S where the sensor 130 is positioned so that the sensor 130 senses the magnet 125. The sensor 130 transmits a second water level sensing signal to the controller, and the controller stops the dehumidifying operation by controlling the driver of the dehumidifier 1.

Thereby, the water level detecting device D2 according to the second embodiment easily selects and changes the water level of the water container 110 with the simple switching operation through the switching member 140. The following will describe the constitution of a water level detecting device D3 according to a third embodiment by referring to FIGS. 11 to 13. The water level detecting device D3 according to the third embodiment includes two sensing components that respectively sense the first water level and the second water level of the interior of the water container 210.

Figure 11:
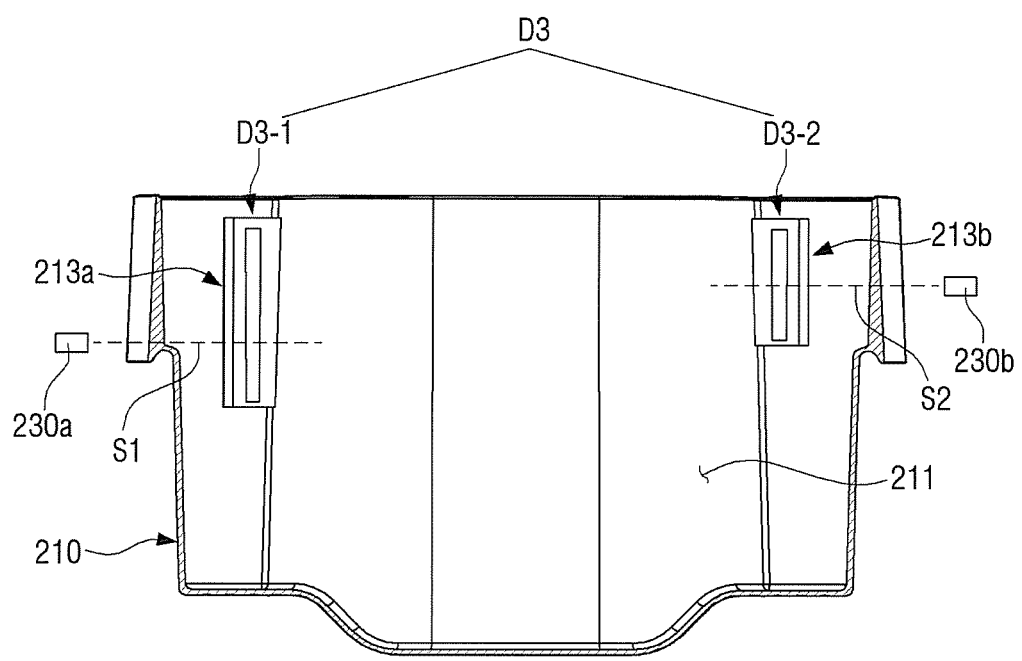
FIG. 11 is a partially-cut cross sectional view illustrating an example water level detecting device installed on a water container according to this disclosure.

Referring to FIG. 11, the water level detecting device D3 according to the third embodiment includes a first water level detector D3-1 on a portion adjacent to a left side of the water container 210 and a second water level detector D3-2 on a portion adjacent to a right side of the water container 210. The first water level detector D3-1 is provided to sense the first water level, and includes a guide 213a arranged in an interior 211 of the water container 210, a sensing object 220a inserted into an interior 214a of the guide 213a so as to ascend by the buoyancy, and a sensor 230a to sense a magnet 25 provided on the sensing object 220a. The guide 213a, the sensing object 220a and the sensor 230a is configured uniformly as the water level detecting device D1 according to the first embodiment, and will not be specifically described below for the sake of brevity.

However, regarding the first water level detector D3-1, the position of the magnet 25 provided on the sensing object 220a is differently arranged from the position of the magnet 25 provided on the sensing object 20 of the first water level detecting device D1. Thus, referring to FIG. 12, the magnet 225a of the sensing object 220a is arranged in a position corresponding to the center of the sensing object 220a. The second water level detector D3-2 is provided to sense the second water level which is greater than the first water level. Likewise the first water level detector D3-1, the second water level detector D3-2 includes a guide 213b, a sensing object 220b inserted into an interior 214b of the guide 213b so as to ascend, and a sensor 230b to sense a magnet 225b provided on the sensing object 220b.

Figure 12:
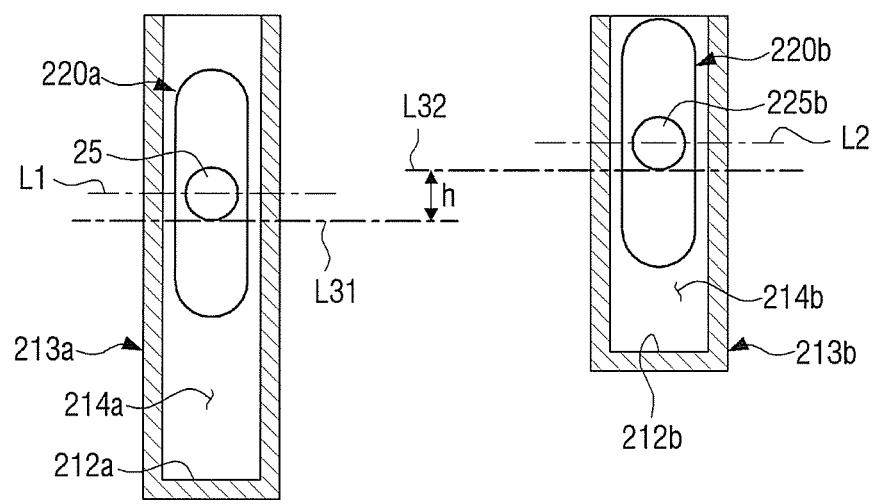
FIG. 12 illustrates example first and second sensing objects floating on positions corresponding to a first and a second water levels, respectively, according to this disclosure.

In this case, the length of the guide 213b and the installing position of the sensor 230b is different from the first water level detector D3-1, and the sensing object 220b is configured uniformly as the first water level detector D3-1. Referring to FIG. 12, the guide 213b of the second water level detector D3-2 having different length from the first water level detector D3-1 is formed in a shorter length than the guide 213a of the first water level detector D3-1. Further, the bottom 212b of the guide 213b is positioned on higher than the bottom 212a of the guide 213a of the first water level detector D3-1. Thereby, the sensing object 220b inserted into the guide 213b of the second water level detector D3-2 is positioned in the initial position S2 which is higher than the initial position S1 of the guide 213a of the first water level detector D3-1.

Regarding the initial positions S1, S2 of the sensing objects 220a, 220b, the installing positions of the sensors 230a, 230b is differently set. Thus, the sensor 230a of the first water level detector D3-1 is positioned correspondingly to the initial position S or adjacent to the initial position S1. In this case, the installing position of the sensor 230b of the second water level detector D3-2 is set to higher than the installing position of the sensor 230a of the first water level detector D3-1 while the sensor 230b is positioned correspondingly to the initial position S2 or adjacent to the initial position S2. Regarding the sensors 230a, 230b constituted as described above, the maximum sensing positions L31, L32 (FIG. 12) in which the magnets 25, 225b of the sensing objects 220a, 220b is respectively sensed may have the difference to each other by a predetermined interval (h).

Figure 13:
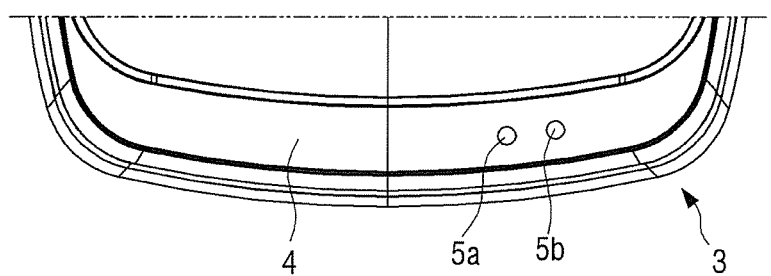
FIG. 13 is a schematic view illustrating example first and a second set buttons to set a first and a second water levels on an upper surface of the dehumidifier according to this disclosure.

The water level detecting device D3 according to the third embodiment includes a first and a second set buttons 5a, 5b on an upper surface 4 of the main body 3, as illustrated in FIG. 13 so that a user sets the water level of the water container 210 between the first and the second water level. The first and the second set buttons 5a, 5b sets the first water level L1 and the second water level L2 of the water container 210, and is implemented to be a mechanical button or with a capacitive touch screen method. When a user selects the first set button 5a, the controller receives the first setting signal from the first set button 5a, and turn off the sensor 230b of the second water level detector D3-2 so that the second water level L2 is not sensed. On the contrary, when a user selects the second set button 5b, the controller receives the second setting signal from the second set button 5b, and turn off the sensor 230a of the first water level detector D3-1 so that the first water level L1 is not sensed.

Further, a user selects both of the first and the second set buttons 5a, 5b. In this case, the controller turns on the sensors 230a, 230b, inform a user that the first water level of the condensate water is collected in the water container 210 through the outputter provided on the main body 3 when the sensor 230a of the first water level detector D3-1 senses the first water level L1, inform a user that the second water level of the condensate water is collected in the water container 210 through the outputter provided on the main body 3 when the sensor 230b of the second water level detector (D3-2) senses the second water level L2, and control the dehumidifier 1 to discontinue the dehumidifying operation.

The water level detecting device D3 according to the third embodiment changes the water level of the water container 210 with the simple operation of selecting at least one of the first and the second set button, sensing the changed set water level and informing a user. The following will explain the constitution of a water level detecting device D4 according to a fourth embodiment by referring to FIG. 14. The water level detecting device D4 according to the fourth embodiment is configured uniformly as the water level detecting device D1 according to the first embodiment. However, the water level detecting device D4 has a difference in that a plurality of the sensors 330a, 330b are included. The following will describe the water level detecting device D4 according to the fourth embodiment mainly based on the different constitution, while the uniform constitution to the water level detecting device D1 according to the first embodiment may not be specifically described for the sake of brevity.

Figure 14:
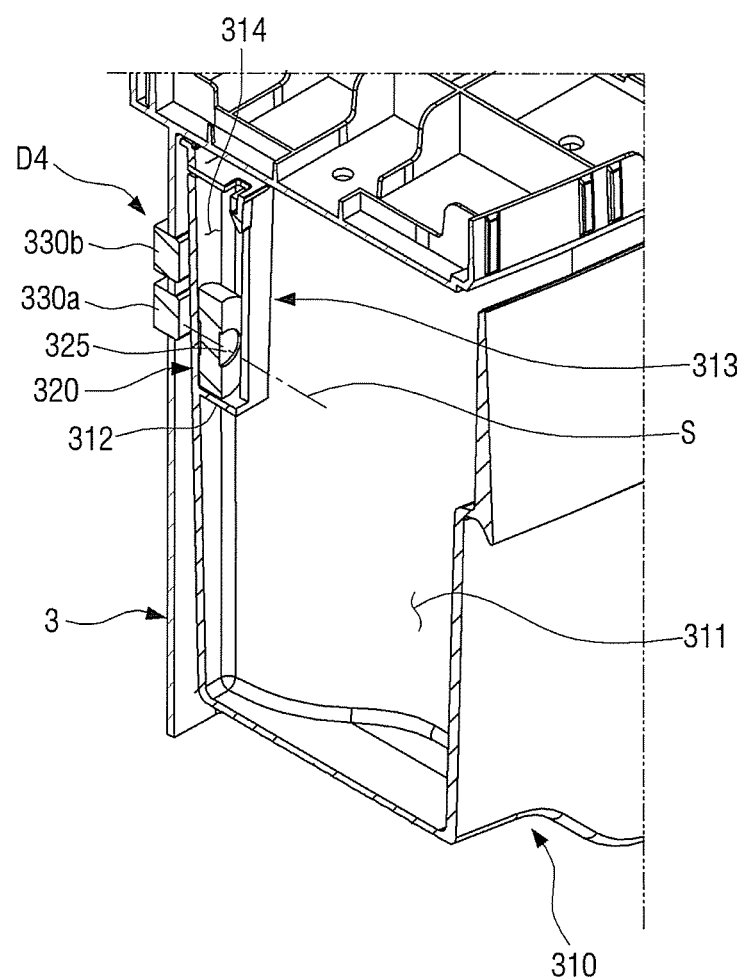
FIG. 14 is a partially-cut cross sectional view illustrating an example water level detecting device installed on a water container according to this disclosure.

Referring to FIG. 14, the water level detecting device D4 according to the fourth embodiment includes a guide 313 arranged in the interior 311 of the water container 310, a sensing object 320 inserted into an interior 314 of the guide 313 so as to ascend by the buoyancy, and a first and a second sensors 330a, 330b to sense a magnet 325 provided on the sensing object 320. The first sensor 330a senses the initial position S where the sensing object 320 is seated on the bottom 312 of the guide 313, and transmit a first water level sensing signal to the controller by sensing the magnet 325 when the sensing object 320 floats on the condensate water, ascends along the interior 314 of the guide 313, and reaches the position corresponding to the first water level. The second sensor 330b is arranged in a position which is higher than the first sensor 330a, and transmits a second water level sensing signal to the controller by sensing the magnet 325 of the sensing object 320 ascending after the first water level.

Meanwhile, the water level detecting device D4 according to the fourth embodiment includes a plurality of the set buttons 5a, 5b on the main body 3 to control the first and the second sensors 330a, 330b, as described above regarding the water level detecting device D3 according to the third embodiment. As described herein, the water level detecting device D4 according to the fourth embodiment includes the two sensors 330a, 330b only, but embodiments are not limited thereto. Three or more sensors are arranged in a vertical direction, setting and changing the water level of the water container 330 to a plurality of stages.

Figure 15A:
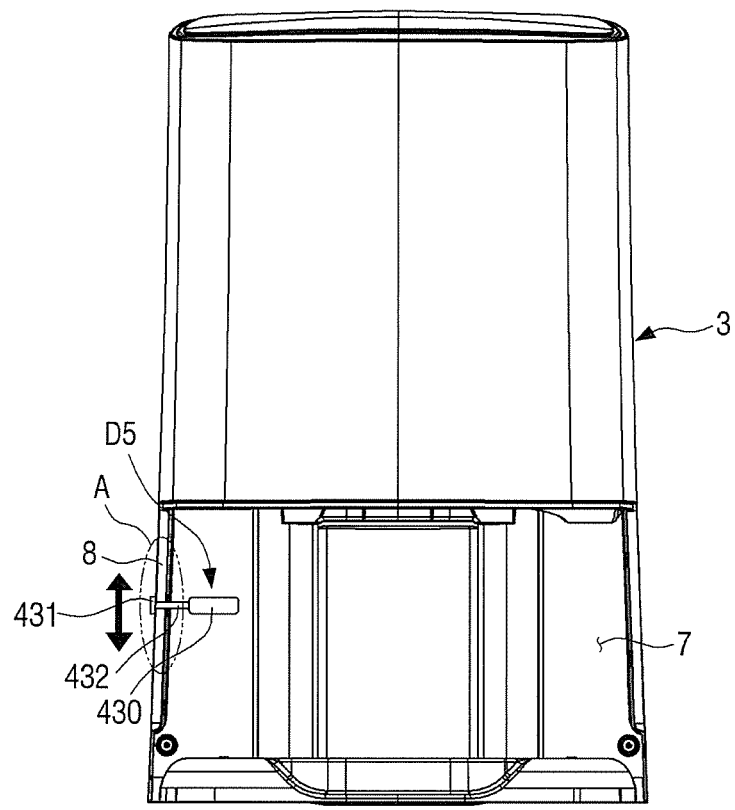
FIG. 15A illustrates an example sensor of a water level detecting device changed into a position corresponding to a water level according to this disclosure.
Figure 15B:
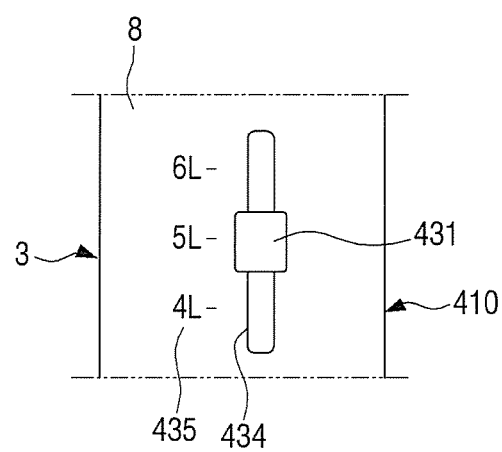
FIG. 15B is a partially expanded view of an example adjustment button exposed to an exterior of one wall regarding the main body of the dehumidifier according to this disclosure.

The following will describe the constitution of a water level detecting device D5 according to a fifth embodiment by referring to FIGS. 15A and 15B. The water level detecting device D5 according to the fifth embodiment is configured uniformly as the water level detecting device D1 according to the first embodiment described above. However, the water level detecting device D5 has a difference in that the position of the sensor 430 is changed. The following will describe the water level detecting device D5 according to the fifth embodiment mainly based on the difference, while the uniform constitution to the water level detecting device D1 according to the first embodiment may not be described for the sake of brevity.

The sensor 430 of the water level detecting device D5 according to the fifth embodiment is connected with an adjustment button 431 by a connecting rod 432 penetrating through one sidewall 8 of the main body 3 as shown in view A. Thereby, while the position of the sensor 430 arranged within the main body 3 is moved vertically according to the vertical adjustment of the adjustment button 431 exposed to an exterior of the main body 3, the position in sensing the water level is changed.

Referring to FIG. 15B, a sliding hole 434 for guiding the connecting member 432 to slidably move vertically is formed roughly in a vertical direction along the one sidewall 8 of the main body 3. In this case, the indicator 435 indicating the water level to be applied to the water container 410 according to the steps is formed at predetermined intervals on the exterior of the one sidewall 8. As such, the water level of the water container 110 is easily selected and changed with the simple operation of vertically changing the position of the adjustment button 431 of the water level detecting device D5 according to the fifth embodiment to a desired water level.

Figure 16:
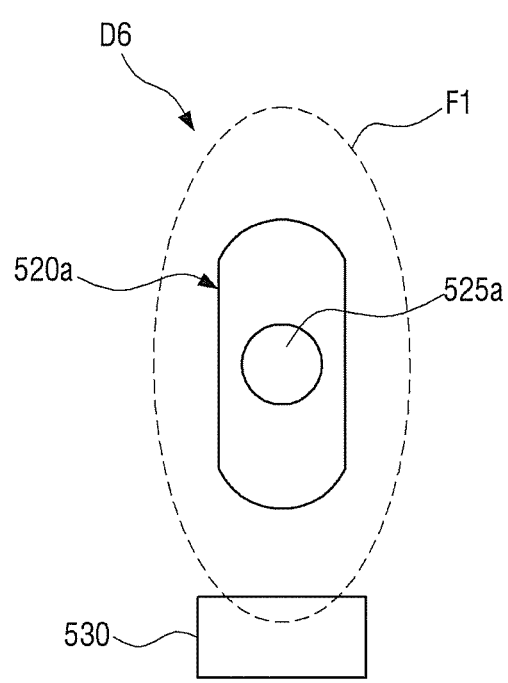
FIGS. 16 and 17 are example diagrams provided to explain a water level detecting device illustrating different magnetic field areas which influence sensors as magnets having different magnetic intensities to each other are applied to the sensing object according to this disclosure.
Figure 17:
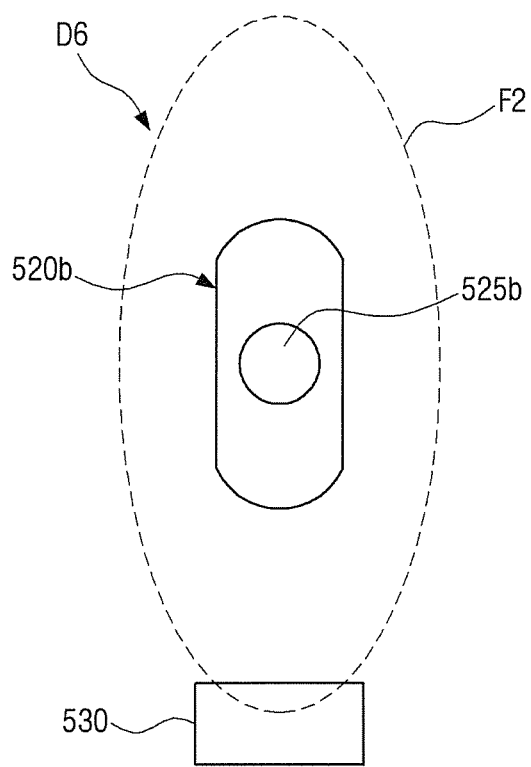

The following will describe a water level detecting device D6 according to a sixth embodiment by referring to FIGS. 16 and 17. The water level detecting device D6 according to the sixth embodiment is configured uniformly as the water level detecting device D1 according the a first embodiment described above. However, there is a difference in the sensing object 520. The following will describe mainly the sensing object 520 having the difference, while the uniform constitution to the water level detecting device D1 according to the first embodiment described will not be described for the sake of brevity.

The water level detecting device D6 according to the sixth embodiment is constituted uniformly to the water level detecting device D1 according to the first embodiment. However, as illustrated in FIGS. 16 and 17, the first and the second sensing objects 520a, 520b includes a first and a second magnets 525a, 525b on the centers of the sensing objects 520a, 520b. In this case, the first and the second magnets 525a, 525b has different magnetic intensities to each other and thus have different magnetic fields (F1, F2). Unit 530 also can be included.

According to the first embodiment, the position of the sensing object 20 is changed to invert the upper and the lower sides of the sensing object 20 to thus change the set water level. However, in the water level detecting device D6 according to the sixth embodiment, the water level of the water container is changed by substituting with any of the first sensing object 520a having the first magnet 525a and the second sensing object 520b having the second magnet 525b with different magnetic fields F1, F2 to each other. Thus, when the water level of the water container is set to the first water level, the first sensing object 520a provided with the first magnet 525a of smaller magnetic field than the second magnet 525b is used. Further, when the water level of the water container is set to the second water level which is greater than the first water level, the second sensing object 520b provided with the second magnet 525b having the greater magnetic field than the first magnet 525a is substituted and used instead of the first sensing object 520a.

Figure 18:
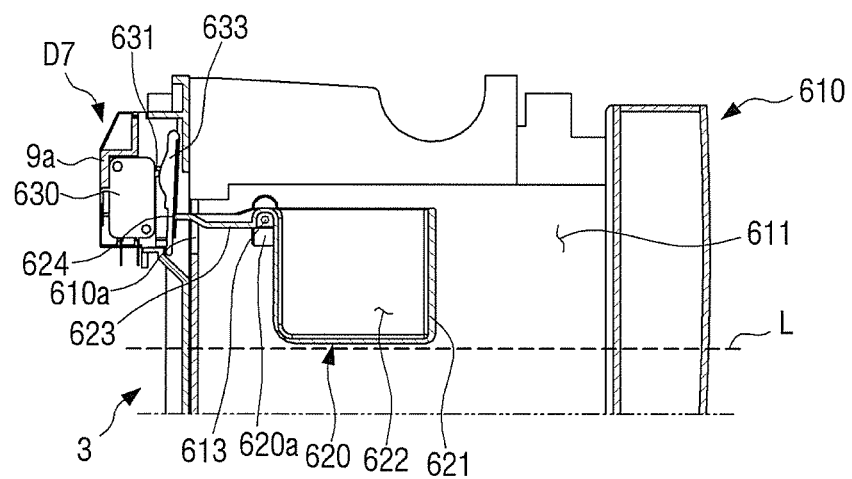
FIG. 18 illustrates an example water level detecting device according to this disclosure.
Figure 19:
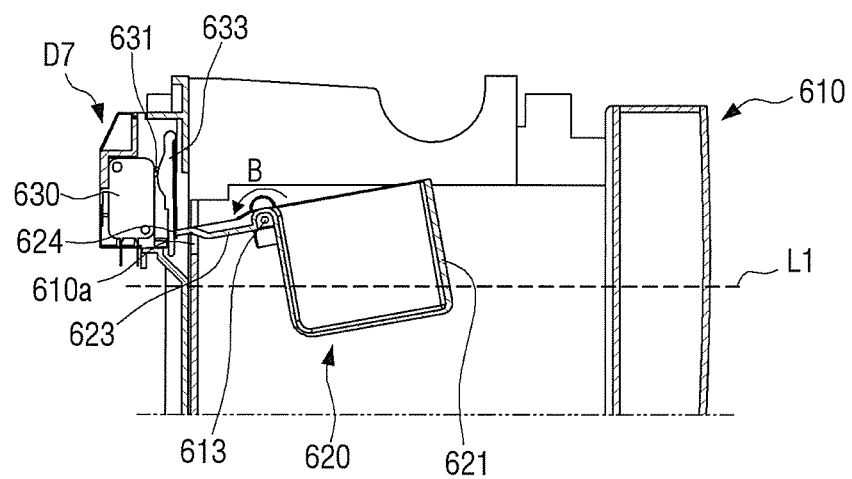
FIG. 19 illustrates an example sensing object floating on a position corresponding to a first water level according to this disclosure.
Figure 20:
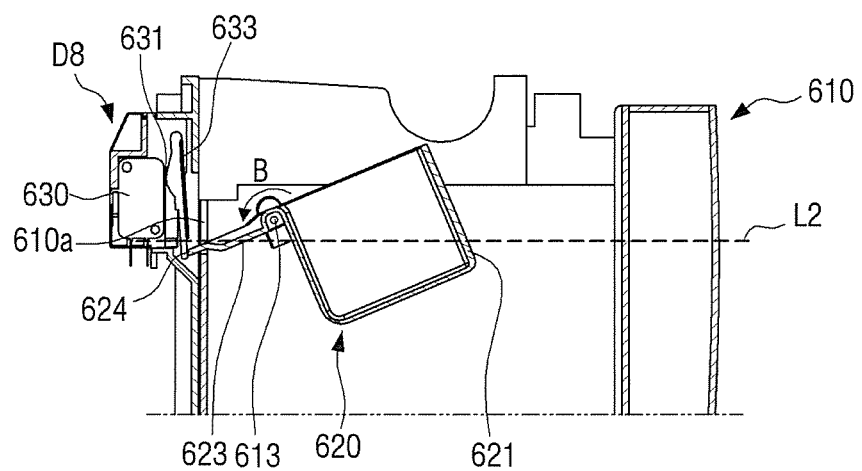
FIG. 20 illustrates an example sensing object floating on a position corresponding to a second water level according to this disclosure.

The following will describe the constitution of a water level detecting device D7 according to a seventh embodiment by referring to FIGS. 18 to 20.

The water level detecting device D7 according to the seventh embodiment includes a guide 613 arranged in an interior 611 of the water container 610, a sensing object 620, and a sensor 630. Referring to FIG. 18, the guide 613 guides the sensing object 620 to rotate toward one direction when the sensing object 620 floats and ascends on the condensate water collected in the water container 610. The guide 613 is formed as a hinge axis which is coupled with a portion 620a of the sensing object 620. The sensing object 620 includes a floating portion 621 in which a space 622 is provided on a right side based on the guide 613, and a compressing protrusion 623 integrated with the floating portion 621 on the right side based on the guide 613. In this example, a front end 624 of the compressing protrusion 623 is protruded outside the water container 610 through a penetrating portion 610a of the water container 610. Thereby, the compressing protrusion 623 presses the portion of the sensor 630 with a predetermined pressure when the water container 610 is mounted in the receiving portion 7 of the main body 3.

The floating portion 621 ascends while floating on the condensate water collected in the water container 610. Herein, the floating portion 621 rotates in a B direction (see FIG. 19) based on the guide 613. The compressing protrusion 623 operates the sensor 630 by pressing the portion of the sensor 630 arranged within the portion of the inner wall of the receiving portion 7 of the main body 3 when the floating portion 621 rotates. In this case, the compressing position of the compressing protrusion 623 is changed with respect to the portion of the sensor 630 according to the rotating angle of the floating portion 621, as illustrated in FIGS. 19 and 20.

The sensor 630 is arranged on the inner wall while being inserted into the receiving portion 7 of the main body 3, and fixed by a predetermined bracket 9a. An operation button 631 protruded toward the sensing object 620 and a circular rod 633 to press the operation button 631 is hinged on the one side of the sensor 630. The operation button 631 is changed into the first to the third state in which the pushing is not performed by the circular rod 633 with the different pressure, as illustrated in FIGS. 18 to 20.

The sensor 630 transmits a water container mount signal to the controller when the operation button 631 is in the first state, and respectively transmits a first and a second water level sensing signals to the controller when the operation button 631 is in the second and the third states. The following will describe the operation of the water level detecting device D7 according to the seventh embodiment by referring to drawings.

Referring to FIG. 18, the water container 610 is mounted in the receiving portion 7 of the main body 3, and the front end 624 of the compressing protrusion 623 pushes the first position of the circular rod 633 of the sensor 630. Thereby, the circular rod 633 pushes the operation button 631 with the first pressure, and the sensor 630 transmits a water container mount signal to the controller. Referring to FIG. 19, when the water level of the condensate water collected in the water container 610 ascends and reaches the water level corresponding to the first water level L1, the floating portion 621 of the sensing object 620 gradually floats and rotates toward B direction based on the guide 613. Herein, the compressing protrusion 623 circularly rotate toward B direction along the circular rod 633 while contacting the circular rod 633, and the front end 624 of the compressing protrusion 623 pushes the second position which is lower than the first position of the circular rod 633. Thereby, the circular rod 633 pushes the operation button 631 with the second pressure which is greater than the first pressure and the sensor 630 transmits a first water level sensing signal to the controller.

Referring to FIG. 20, when the water level of the condensate water collected in the water container 610 further ascends and reaches the water level corresponding to the second water level L2, the front end 624 of the compressing protrusion 623 pushes the third position which is lower than the second position according to the rotating of the floating portion 621 of the sensing object 620. Thereby, the circular rod 633 pushes the operation button 631 with the third pressure which is greater than the second pressure, and the sensor 630 transmits a second water level sensing signal to the controller.

The water level detecting device D7 according to the seventh embodiment is provided with the first and the second set buttons 5a, 5b on the upper surface 4 of the main body 3 (see FIG. 13) so that the water level of the water container 610 is set to any of the first and the second water levels, as described above with reference to the water level detecting device D3 according to the third embodiment. Thus, the water level detecting device D7 according to the seventh embodiment changes the water level of the water container 610 with the simple operation of selecting at least one of the first and the second set buttons 5a, 5b, sensing the changed set water level, and informing a user that the water container 610 is in the full state through the outputter provided on the main body 3.

Figure 21:
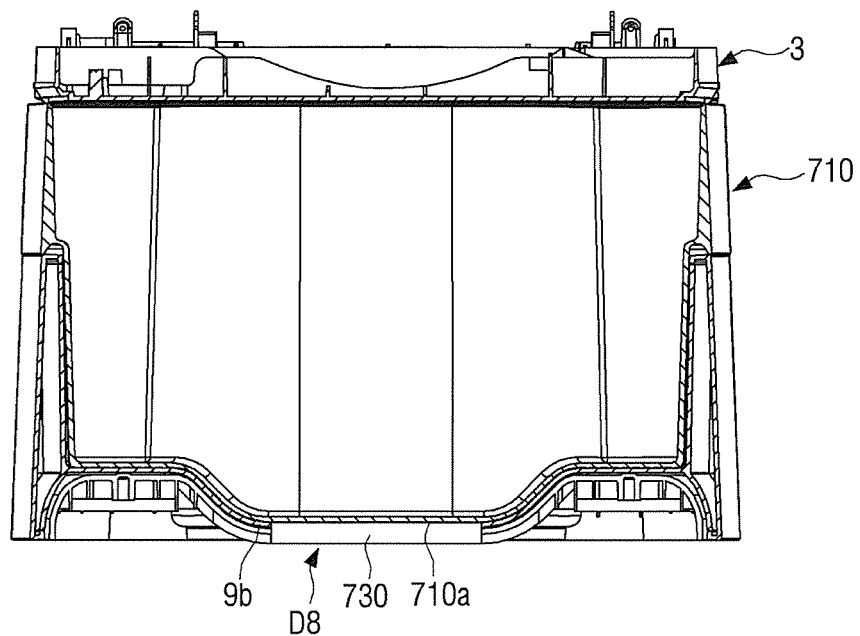
FIG. 21 illustrates an example water level detecting device according to this disclosure.
Figure 22:
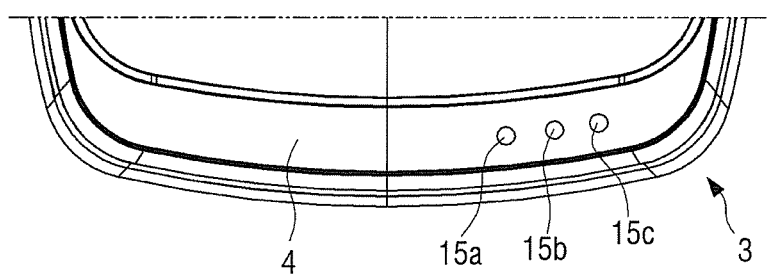
FIG. 22 is an example schematic view illustrating a first to a third set buttons to set a first to a third water levels on an upper surface of the dehumidifier according to this disclosure.

The following will describe the constitution of the water level detecting device D8 according to an eighth embodiment by referring to FIGS. 21 and 22. Referring to FIG. 21, the water level detecting device D8 according to the eighth embodiment includes a sensor 730 on a bottom 9b of the receiving portion 7 of the main body 3. The sensor 730 includes rod cells 710a that senses the weight of the water container 710 and the weight of the condensate water collected in the water container 710.

Further, the main body 3 is provided with a first to a third set buttons 15a, 15b, 15c on the upper surface 4 of the main body 3, as illustrated in FIG. 22. The first to the third set buttons 15a, 15b, 15c sets the first to the third water levels (e.g., '4 L', '5 L', '6 L') of the water container 710. Thus, the controller provided on the main body 3 stops the dehumidifying operation of the dehumidifier 1 if the sensor 730 senses the weight corresponding to the water level when any one of the first to the third set buttons 15a, 15b, 15c is selected.

Meanwhile, when the water container 710 is mounted in the receiving portion 7 of the main body 3, the sensor 730 senses the weight of the water container 710 and transmits the weight value to the controller. Further, when the condensate water is collected in the water container 710, the sensor 730 senses the total weight of adding the weight of the water container 710 to the weight of the condensate water, and transmit the total weight value to the controller.

The controller previously stores the sum weight of the water container 710, by adding the weight of the water container 710 to the weight values of the condensate water collected in the water container 710 corresponding to the first to the third water levels. In this example, the controller receives the sensed weight from the sensor 730 at real time, and compares the received value with the previously stored weight values. When the received value corresponds to the water level set by a user, the controller stops the dehumidifying operation of the dehumidifier 1, and informs a user that the water container 710 is in the full state through the outputter. Thus, a user easily changes the various water levels with a plurality of the set buttons 15a, 15b, 15c as well as set the water level of the water container 710.

Figure 23:
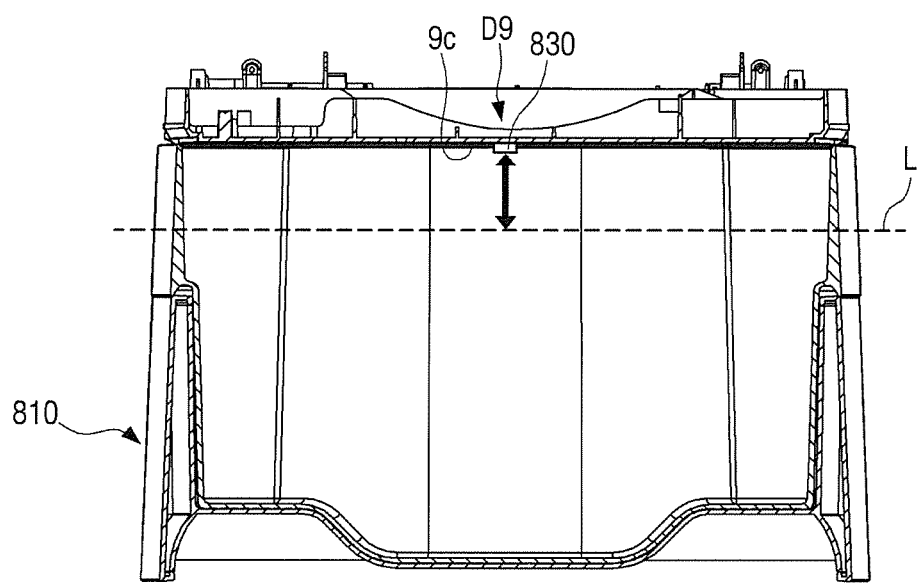
FIG. 23 illustrates an example water level detecting device according to this disclosure.
Figure 24:
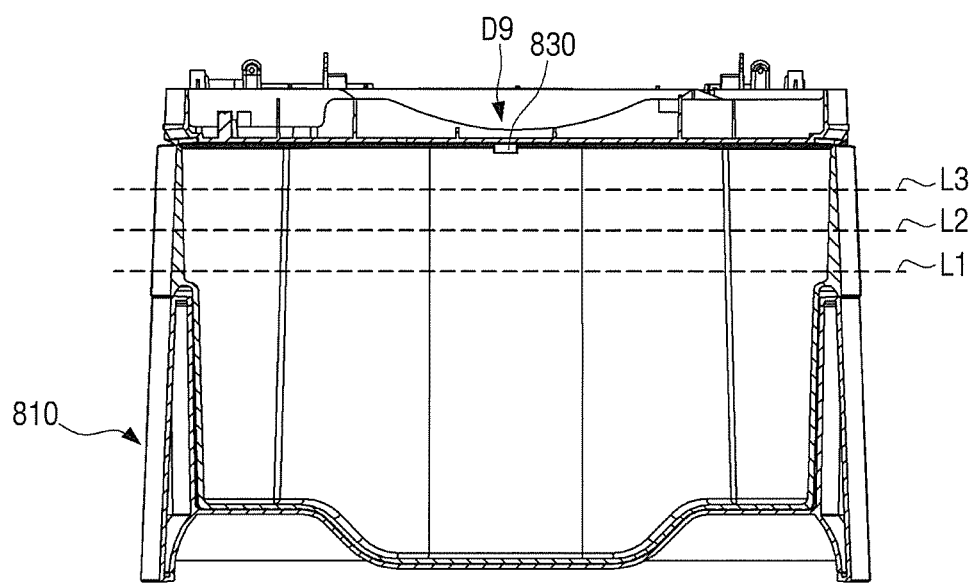
FIG. 24 illustrates example water levels of the water container respectively regarding the first to the third water levels according to this disclosure.

The following will describe the constitution of the water level detecting device D9 according to a ninth embodiment by referring to FIGS. 23 and 24. Referring to FIG. 23, the water level detecting device D9 according to the ninth embodiment includes a sensor 830 arranged on an upper sidewall 9c of the receiving portion 7 of the main body 3. In the above example, the sensor 830 is faced toward a bottom of the water container 810. Further, the sensor 830 is implemented to be ultrasonic sensor sensing the water level of the condensate water collected in the water container 810 with the ultrasounds during the dehumidifying operation of the dehumidifier 1. The sensor 830 senses a distance from the sensor 830 to the bottom of the water container 810 or a distance from the sensor to the water surface of the collected condensate water when the water container 810 is mounted in the receiving portion 7 of the main body 3, and transmit the distance value to the controller.

The controller previously stores the distance value from the sensor 830 to the bottom of the water container 810, and the values corresponding to the distances from the sensor 830 to the first to the third water levels collected in the water container 810. Thereby, the controller receives the distance value sensed by the sensor 830 at real time and compares the received value with the previously stored values. When the received value corresponds to the water level set by a user, the controller stops the dehumidifying operation of the dehumidifier 1 and informs the user that the water container 810 is in the full state through the outputter.

The water level detecting device D9 according to the ninth embodiment is preferably provided with a first to a third set buttons 15a, 15b, 15c on the upper surface 4 of the main body 3 (see FIG. 22) so that the water level of the water container 810 is set, as described above with reference to the water level detecting device D8 according to the eighth embodiment. Meanwhile, the controller determines only the distance value sensed by the sensor 830 corresponding to the first water level L1 which is lowest among the first to the third water levels L1, L2, L3, as illustrated in FIG. 24. In this case, the controller determines the second and the third water levels L2, L3 by checking the time for the set amount from the time to sense the first water level L1. For example, the second water level L2 is previously-set by stating that it passes after one hour from the time to sense the first water level L1, and the third water level L3 is previously-set by stating that it passes after two hours from the time to sense the first water level L1.

When the controller determines the second and the third water levels L2, L3 with the time elapsed from the time of sensing the first water level L1, the water level detecting device D9 according to a ninth embodiment includes a temperature sensor and a moisture sensor to sense the temperature and the moisture in the air absorbed within the dehumidifier 1 in order to further correctly determine the sensing time of the second and the third water levels L2, L3. Thus, the controller delays or advances the time to determine the second and the third water levels L2, L3 by considering the temperature and the moisture sensed by the temperature sensor and the moisture sensor. The following will describe the mounting and dismounting of the water container of the dehumidifier 1000 according to an embodiment by referring to FIGS. 25 to 30. Regarding the water container jointing and disjoining constitution, a user easily dismounts the water container 1300 from the dehumidifier 1000 without bending waist or knees.

Figure 25:
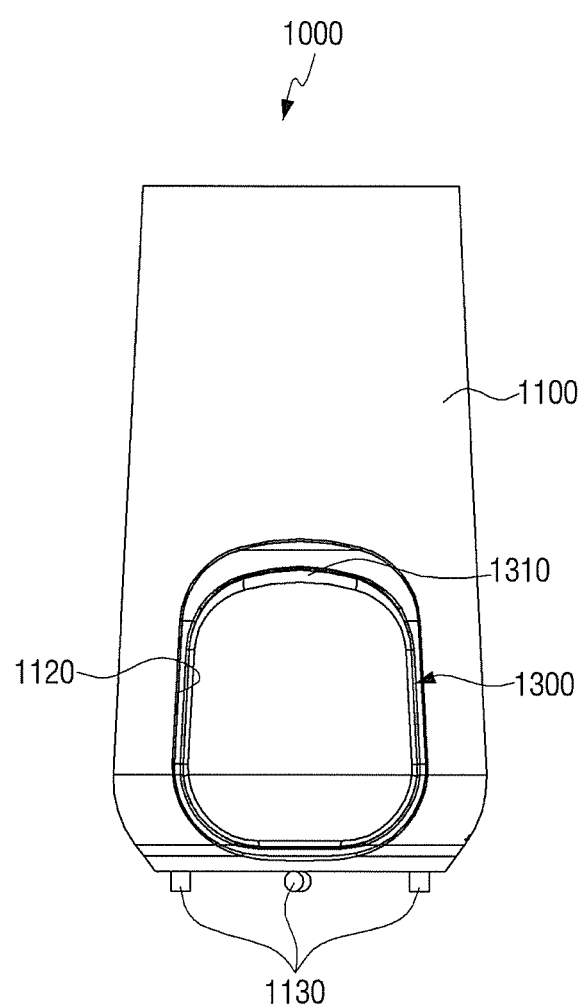
FIGS. 25 and 26 is an example front view and an example side view, respectively, illustrating the dehumidifier according to this disclosure.
Figure 26:
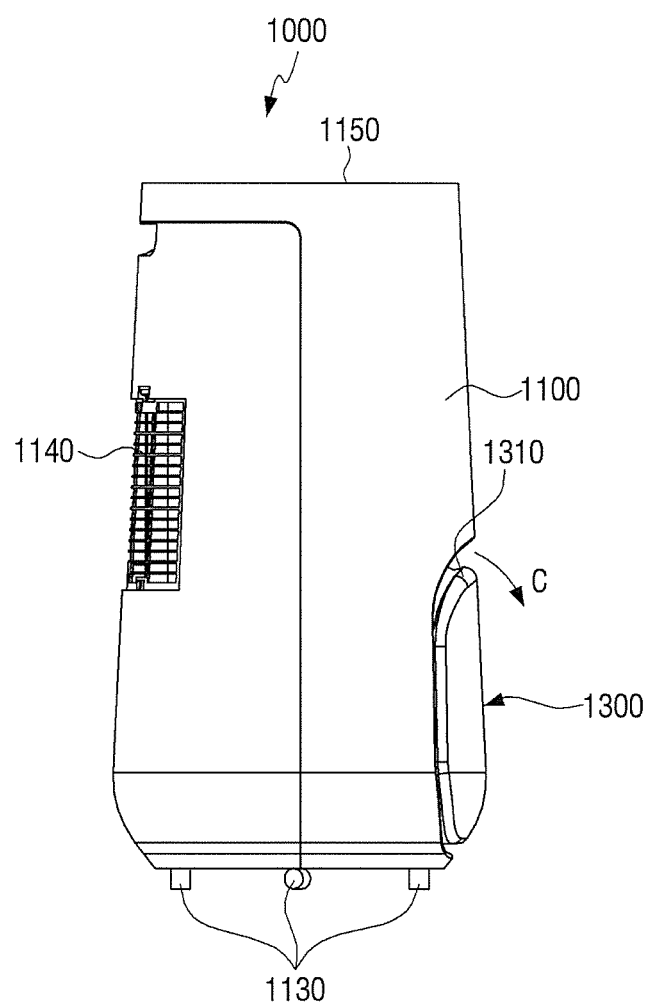
Figure 27:
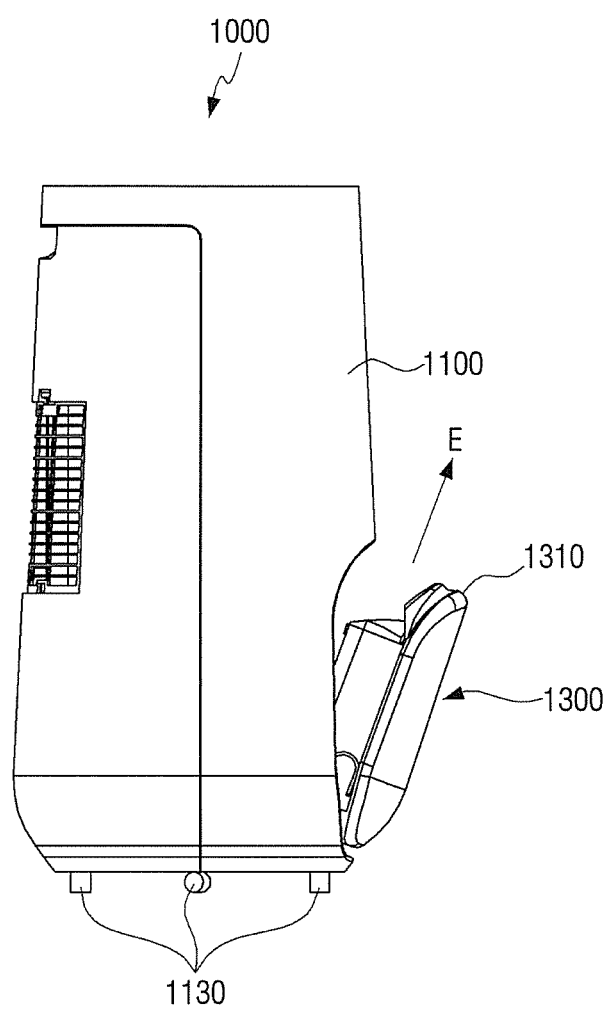
FIG. 27 is a side view illustrating an example water container in a slanted arrangement before being taken out from a receiving portion of a main body according to this disclosure.

Referring to FIG. 25, the dehumidifier 1000 according to an embodiment includes a main body 1100, and a water container 1300 detachably mounted to the main body 1100. Referring to FIGS. 26 and 27, components to implement the dehumidifying operation is arranged within the main body 1100, a filter 1140 is mounted in the back section, and a plurality of air discharging holes (not illustrated) is formed on the upper surface 1150. Further, the main body 1100 includes a plurality of wheels 1130 on the lower section to allow the dehumidifier 1000 to move.

Figure 28:
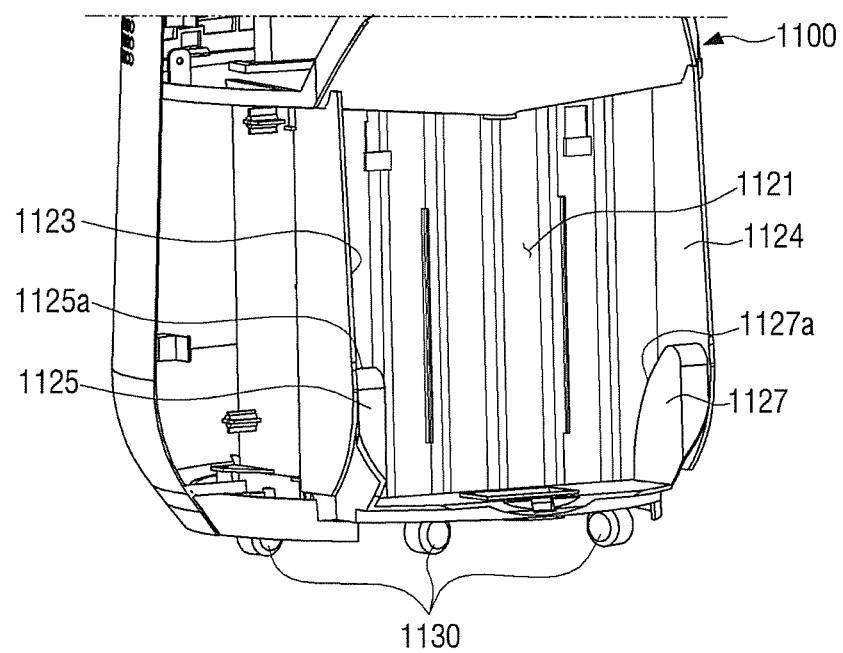
FIG. 28 is a perspective view of an example pair of guiding protrusions provided on both sides of a receiving portion of a main body according to this disclosure.

Referring to FIG. 28, the main body 1100 is provided with a receiving portion 1121 in which the water container 1300 is mounted to the lower side of the front end. In this case, the first and the second guiding protrusions 1125, 1127 to face with each other protrudes on the both walls 1123, 1124 of the front end of the receiving portion 1121. The first and the second guiding protrusions 1125, 1127 is formed symmetrically, and the guide surfaces 1125a, 1127a protrudes on the upper surface in a curved shape.

Figure 29:
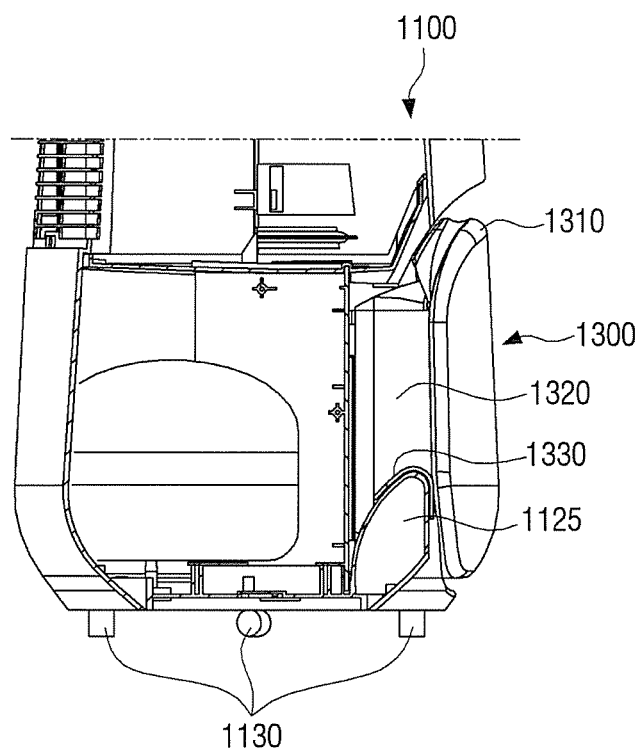
FIG. 29 is a side view illustrating an example guiding protrusion of a receiving portion shaped to correspond to a guide rib of a water container and to a guide surface of a guiding protrusion according to this disclosure.
Figure 30:
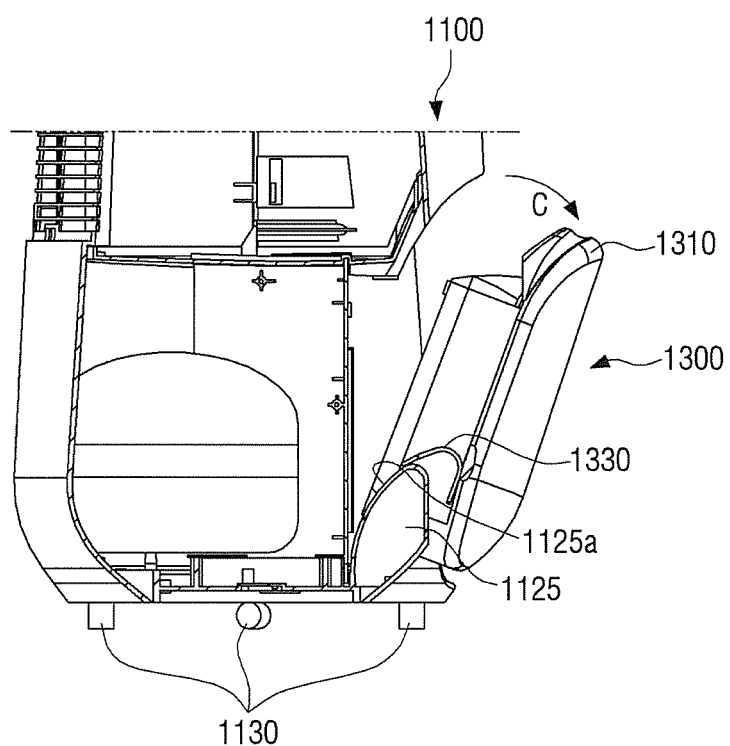
FIG. 30 is an example side view illustrating a guide rib being guided by a guiding protrusion in the process a water container is taken out from a receiving portion of a main body according to this disclosure.

Referring to FIGS. 29 and 30, the water container 1300 is detachably mounted in the receiving portion 1121 of the main body 1100, and fixed by a related push-lock structure 1320 which is provided in the interior 1120 of the upper surface 1310 of the water container 1300 and the portion of the entering gate of the receiving portion 1121. The push-lock structure 1320 is structure in which the unlocking is performed by pushing the upper surface of the water container 1300 toward the main body 1100 and un-pushing, and the locking is performed by pushing the upper surface of the water container 1300 again and un-pushing. Thereby, if a user pushes the upper surface 1310 of the water container 1300 and un-pushes when the water container 1300 is dismounted from the main body 1100, the water container 1300 is taken out to be slid toward C direction (see FIG. 30) because the locking is released.

Further, the water container 1300 includes a guide rib 1330 to be guided by the first and the second guiding protrusions 1125, 1127 respectively on both sides. In the above example, the guide rib 1330 is formed in a shape corresponding to the guide surfaces 1125a, 1127a of the first and the second guiding protrusions 1125, 1127. Thereby, when the upper surface of the water container 1300 is taken out by a user toward the C direction, the guide rib 1330 is slidably guided along the guide surfaces 1125a, 1127a of the first and the second guiding protrusions 1125, 1127.

In the above example, while the upper surface of the water container 1300 is slid toward the side being spaced apart from the main body 3, the water container 1300 is taken out toward E direction which is directed to the upper body of a user as illustrated in FIG. 27. Thus, a user dismounts the water container 1300 from the receiving portion 1121 in the standing position without having to bend waist or knees.

Meanwhile, although FIGS. 25 to 30 do not illustrate the water level detecting device of the dehumidifier 1000, any one of the above described first to ninth water level detecting devices D1-D9 is applied to the dehumidifier 1000. Thus, a user selectively sets at least two water levels of the water container 1300 through the dehumidifier 1000.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A water level detecting device, comprising:
a guide arranged on an upper portion of an inner surface of a water container for collecting a condensate water generated as a dehumidifying function is performed, the guide including an opening on an upper end, an interior formed as a space, and a side comprising a condensate water inlet formed as an elongated hole in the side of the guide, wherein the guide is a separate member and detachably coupled to the inner surface of the water container;
a sensing object configured to:
insert a first inserting direction in the interior of the guide to set a first water level,
insert a second inserting direction in the interior of the guide to set a second water level, and
ascend, in the interior of the guide, on the condensate water collected in the water container; and
a sensor arranged in a main body of a dehumidifier which the water container is mounted to and dismounted from, and configured to sense a movement of the sensing object, wherein a water level of the water container is set to any of at least two different water levels through the guide for both the first inserting direction and the second inserting direction without changing a setting of the sensor,
wherein the guide is provided to prevent the sensing object from rotating in the interior of the guide, wherein the sensing object is inserted within the interior of the guide and is prevented from rotating by an inner surface of the guide so that an inserting direction of the sensing object is maintained, and wherein when the sensing object is changed from the first water level to the second water level, the sensing object is removed from the interior of the guide through the opening and then inserted into the interior of the guide through the opening in the second inserting direction.

2. The water level detecting device of claim 1, wherein the sensing object comprises a magnet arranged in a closer distance to one side from a center of the sensing object.

3. The water level detecting device of claim 2, wherein the sensing object is configured to be inserted into the guide while the magnet is in an upper or a lower side of the sensing object.

4. The water level detecting device of claim 1, wherein the guide is configured to guide the sensing object to ascend while maintaining a position as being inserted into the guide when the sensing object floats on the condensate water.

5. The water level detecting device of claim 1, further comprising:
   at least one additional guide arranged in an interior of the water container;
   at least one additional sensing object inserted into the at least one additional guide; and
   at least one additional sensor arranged in the main body and configured to sense the at least one additional sensing object, wherein the additional guide is arranged at a height different from a height of a lower end of the guide, and the at least one additional sensor is arranged at a height different from a height at which the sensor is arranged.

6. The water level detecting device of claim 5, wherein the additional guide is formed in a different length from the guide, and wherein the additional sensing object is formed in an uniform length to the sensing object.

7. The water level detecting device of claim 5, further comprising at least two select buttons on an outer side of the main body to turn on or turn off the sensor and the at least one additional sensor.

8. The water level detecting device of claim 1, further comprising an adjustment button connected to one side of the sensor and arranged outside the main body, wherein the adjustment button is configured to modify a height of the sensor by sliding vertically along an outer surface of the main body.

9. The water level detecting device of claim 7, further comprising at least one additional sensing object provided with a magnet having a different magnetic intensity from a magnetic intensity of the magnet provided on the sensing object, wherein one of the sensing object and the at least one additional sensing object is configured to be inserted into the guide.

10. The water level detecting device of claim 1, further comprising a controller configured to calculate a time elapsed from a time to sense a lowest water level through the sensor, compare the calculated elapse time with at least one previously-set elapse time, and determine the calculated elapse time to be at least one water level on a higher position than the lowest water level when the calculated elapse times uniform to the previously-set elapse time.

11. A dehumidifier, comprising:
   a main body configured to absorb air that is external to the dehumidifier, remove moisture from the air, and discharge the air outside of the dehumidifier;
   a water container configured to detachably mount to and dismount from a receiving portion of the main body, wherein the water container collects a condensate water generated in a dehumidifying process of the main body; and
   a water level detecting device comprising:
      a guide arranged on an upper portion of an inner surface of the water container, the guide including an opening on an upper end, an interior formed as a space, and a side comprising a condensate water inlet formed as an elongated hole in the side of the guide, wherein the guide is a separate member and detachable coupled to the inner surface of the water container,
      a sensing object configured to be inserted into the interior of the guide and configured to:
         insert a first inserting direction in the interior of the guide to set a first water level,
         insert a second inserting direction in the interior of the guide to set a second water level, and
         float, in the interior of the guide, on the condensate water collected in the water container, and
      a sensor arranged on a receiving portion of the main body and configured to sense a movement of the sensing object, through the guide for both the first inserting direction and the second inserting direction without changing a setting of the sensor,
   wherein the guide is provided to prevent the sensing object from rotating in the interior of the guide,
   wherein the sensing object is inserted within the interior of the guide and is prevented from rotating by an inner surface of the guide so that an inserting direction of the sensing object is maintained, and
   wherein when the sensing object is changed from the first water level to the second water level, the sensing object is removed from the interior of the guide through the opening and then inserted into the interior of the guide through the opening in the second inserting direction.

12. The dehumidifier of claim 11, wherein the water container and the main body are cooperatively configured for the water container to be dismountable from a side of the main body and upwardly from the receiving portion of the main body in a state in which an upper portion of the water container is slanted.

* * * * *